US007847675B1

(12) United States Patent
Thyen et al.

(10) Patent No.: US 7,847,675 B1
(45) **Date of Patent: *Dec. 7, 2010**

(54) SECURITY SYSTEM

(75) Inventors: Chris J Thyen, Jasper, IN (US); Brent Elliott, Salem, IN (US); Jeff Fenwick, Owensboro, KY (US)

(73) Assignee: Kimball International, Inc., Jasper, IN (US)

( * ) Notice: Subject to any disclaimer, the term of this patent is extended or adjusted under 35 U.S.C. 154(b) by 1467 days.

This patent is subject to a terminal disclaimer.

(21) Appl. No.: 11/206,722

(22) Filed: Aug. 18, 2005

Related U.S. Application Data

(63) Continuation-in-part of application No. 10/376,842, filed on Feb. 28, 2003, now Pat. No. 6,965,294.

(60) Provisional application No. 60/360,554, filed on Feb. 28, 2002.

(51) Int. Cl.
*G06K 19/00* (2006.01)
*G08B 13/00* (2006.01)

(52) U.S. Cl. ........................ 340/5.2; 340/5.1; 340/5.31; 340/5.73; 340/5.7; 340/545.6

(58) Field of Classification Search ................. 713/186, 713/193; 340/5.2, 5.1
See application file for complete search history.

(56) References Cited

U.S. PATENT DOCUMENTS

| | | | | |
|---|---|---|---|---|
| 3,701,100 | A | 10/1972 | Yarbrough | 340/149 A |
| 4,712,103 | A | 12/1987 | Gotanda | 340/825.31 |
| 5,086,385 | A | 2/1992 | Launey et al. | 364/188 |
| 5,225,825 | A | 7/1993 | Warren | 340/825.31 |
| 5,337,043 | A | 8/1994 | Gokcebay | 340/825.31 |
| 5,359,322 | A | 10/1994 | Murray | 340/825.31 |
| 5,385,039 | A | 1/1995 | Feldpausch et al. | 70/78 |
| 5,471,616 | A | 11/1995 | Johnson et al. | 395/700 |
| 5,530,435 | A | 6/1996 | Toms et al. | 340/825.07 |
| 5,541,585 | A | 7/1996 | Duhame et al. | 340/825.69 |
| 5,646,605 | A | 7/1997 | Leonaggeo et al. | 340/825.31 |
| 5,684,469 | A | 11/1997 | Toms et al. | 340/825.07 |
| 5,805,074 | A | 9/1998 | Warren et al. | 340/825.31 |
| 5,820,234 | A | 10/1998 | Capwell et al. | 312/216 |
| 5,903,225 | A | 5/1999 | Schmitt et al. | 340/825.31 |
| 5,907,285 | A | 5/1999 | Toms et al. | 340/825.07 |
| 5,942,984 | A | 8/1999 | Toms et al. | 340/825.07 |
| 6,130,621 | A | 10/2000 | Weiss | 340/825.31 |
| 6,133,845 | A | 10/2000 | Toms et al. | 340/825.07 |
| 6,185,613 | B1 | 2/2001 | Lawson et al. | 709/224 |
| 6,211,796 | B1 | 4/2001 | Toms et al. | 340/825.49 |
| 6,446,261 | B1 | 9/2002 | Rosser | 725/34 |
| 6,570,498 | B1 | 5/2003 | Frost et al. | 340/540 |
| 6,720,874 | B2 | 4/2004 | Fufido et al. | 340/541 |
| 6,965,294 | B1 * | 11/2005 | Elliott et al. | 340/5.2 |
| 2001/0025349 | A1 | 9/2001 | Sharood et al. | 713/340 |
| 2002/0016639 | A1 | 2/2002 | Smith et al. | 700/9 |

* cited by examiner

*Primary Examiner*—Thomas Peeso
(74) *Attorney, Agent, or Firm*—Baker & Daniels LLP

(57) ABSTRACT

A security system for monitoring, controlling, and automating one or more work areas and office furniture components, or monitoring, controlling, and automating utility components in other environments such as retail, restaurant, and home applications. The system includes passive and active access authentication devices and active or passive unlocking and lockdown devices for utility components, such as storage components, office furniture components, offices, and work sites. The system may include, for example, a processor, an access authentication device, sensors for monitoring work areas, actuators for controlling and automating work areas, and status and alarm notifiers.

21 Claims, 16 Drawing Sheets

SECURITY SYSTEM

CROSS REFERENCE TO RELATED APPLICATIONS

This application is a continuation-in-part of U.S. patent application Ser. No. 10/376,842, entitled WORKSPACE SECURITY SYSTEM, filed on Feb. 28, 2003, now U.S. Pat. No. 6,965,294, which claims the benefit under Title 35, U.S.C. §119(e) of U.S. Provisional Patent Application Ser. No. 60/360,554, entitled WORKSPACE MONITORING, CONTROL, AND AUTOMATION SYSTEM, filed on Feb. 28, 2002.

BACKGROUND OF THE INVENTION

1. Field of the Invention

The present invention relates to security and automation systems, and in particular to a system for monitoring, controlling, and automating workspaces and office furniture components in multiple offices and facilities, as well as to systems for monitoring, controlling, and automating utility components in other environments, such as retail, restaurant, and home environments.

2. Description of the Related Art

Existing security systems are commonly used to secure the perimeter of a building or complex of buildings. System components generally focus on key entry access points. Typically, security systems include a controller that activates an alarm or other notification device in the event of unauthorized access. However, once the perimeter of a building or complex is breached, there are generally few, if any, security devices protecting individual workspaces, groups of workspaces, departments, or buildings inside the perimeter.

Prior systems for protecting sensitive areas and sensitive materials within the perimeter of offices are generally directed to simple and unmonitored mechanical locks. For example, office components typically have cam locks, which are easily defeated. Systems typically rely solely on perimeter security while sensitive materials in work areas are often unmonitored and whatever locks exist may be unused. Even when personnel intend to use locks to secure sensitive areas and materials, mechanical locks cannot warn personnel when the mechanical locks are accidentally left unlocked. locks to secure sensitive areas and materials, mechanical locks cannot warn personnel when the mechanical locks are accidentally left unlocked.

Examples of automation systems are common in facilities used for manufacturing. However, outside of controlling manufacturing equipment and production lines, workspace automation is generally limited to environmental controls. For example, HVAC controllers that monitor environmental conditions and operate ventilation equipment are typically operated based upon preselected time-of-day settings. Automation in an office environment is generally nonexistent or limited to environmental controls.

What is needed is a workspace security system that provides security, safety, efficiency, and productivity monitoring and control for activity and equipment within workspaces, group of workspaces, departments, or buildings, as well as other environments, such as retail, restaurant, and home applications.

BRIEF SUMMARY OF THE INVENTION

The present invention provides a security system for monitoring, controlling, and automating one or more work areas and office furniture components, or monitoring, controlling, and automating utility components in other environments such as retail, restaurant, and home applications. The system includes passive and active access authentication devices and active or passive unlocking and lockdown devices for utility components, such as storage components, office furniture components, offices, and work sites. The system may include, for example, a processor, an access authentication device, sensors for monitoring work areas, actuators for controlling and automating work areas, and status and alarm notifiers.

An exemplary embodiment of the system is a processor-based system that includes office furniture components positioned in a work area. For example, the work area may be defined by an individual furniture component, such as a desk and the area immediately surrounding it, or the work area may be defined as a security perimeter and portal, such as an office and its entryway.

The system includes an operating processor, such as a programmable logic controller (PLC) or a Windows based processor subsystem, that communicates with a supervisory processor, such as a network-based workstation equipped with monitoring and control software. Communication between the operating and supervisory processor may utilize typical communications links, for example, an encrypted wireless link, a universal serial bus (USB), a local area network (LAN), and the Internet. An existing or additional building security monitoring system may be utilized to provide a wireless or other communication link between the operating and supervisory processor, and to provide remote alarm or other event notification to remote locations via an existing telecommunications network or a dedicated communications link.

The operating processor monitors and controls security devices included in the work area, and may optionally include conductivity to environmental controls such as lights, HVAC, etc. The supervisory processor may monitor more than one work area, for example, each work area having an operating processor in communication with the supervisory processor.

The system may also include video or imaging surveillance that is controlled and monitored by the supervisory processor and activates storage of images by image-detected motion or by motion detection elements of the operating processor. Additionally, one or more other processors may be interfaced locally or remotely to the supervisory processor. For example, a processor for handling remote alarm response and video surveillance monitoring may be linked via the internet to the supervisory processor. Monitoring of the surveillance system by security personnel can effectively eliminate most false security alarms.

Entry and exit of an individual through the portal or into the work area is authenticated by the individual carrying an authorized credential, such as a radio-frequency (RF) transponder identification device, which may be a passive or active RF identification card (RF ID) or other access authentication device. A tuned wire loop antenna located around the entryway or work area desk defines the portal to the secure area, and an authentication controller device “polls” for a credential within the antenna’s electromagnetic radiation pattern. When a credential is detected, a deciphered access code is delivered to the authentication controller to the operating processor, for authorization determination. If motion detected by the surveillance camera, or another indication of presence, is not accompanied with the detection of an authorized credential, the operating processor will transmit an alarm condition to the supervisory processor and images captured by the surveillance camera are recorded.

The furniture components may be retrofit or manufactured with door/drawer status sensors and electromechanical locks, as well as an access authentication device, such as a biometric reader. The sensors, locks, and access authentication device are coupled with the operating processor. The operating processor may also include an audible alarm system for local notification of unauthorized entry. The alarm may also be actuated to signal an unlocked door/drawer condition to alert an authorized individual when that individual is detected to be leaving the security perimeter or workspace In one form, the present invention provides a security system for use with a localized area, including a utility component located within the localized area, the utility component having at least one movable access element; at least one processor; a first access authentication device associated with the localized area and interfaced with the at least one processor; a second access authentication device associated with the utility component and interfaced with the at least one processor; a locking element associated with the at least one access element, the locking element interfaced with the at least one processor; and at least one mobile credential device, each mobile credential device including at least one access code associated with a user.

In another form, the present invention provides a security system, including a utility component having at least one movable access element; a processor associated with the utility component; a locking element associated with the at least one movable access element and interfaced with the processor, the locking element having a first state in which the at least one movable access element is movable between an open and a closed position and a second state in which the at least one movable access element is locked in the closed position; a proximity based access authentication device interfaced with the processor; a non-proximity based authentication device interfaced with the processor; and the processor including operating instructions for switching the locking element between the first state and the second state based upon access data received from the proximity based authentication device and the non-proximity based authentication device.

In yet another form, the present invention provides a method of operating a security system associated with a utility component, including the steps of detecting the presence of a mobile credential device within a localized area surrounding the utility component; obtaining first data corresponding to a biometric characteristic of a user from the mobile credential device; obtaining second data corresponding to the biometric characteristic of the user from the user; comparing the first data with the second data; and granting access to the utility component if the first data matches the second data.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplary embodiments of the invention illustrated herein are not to be construed as limiting the scope of the invention in any manner.

DETAILED DESCRIPTION

Figure 1:
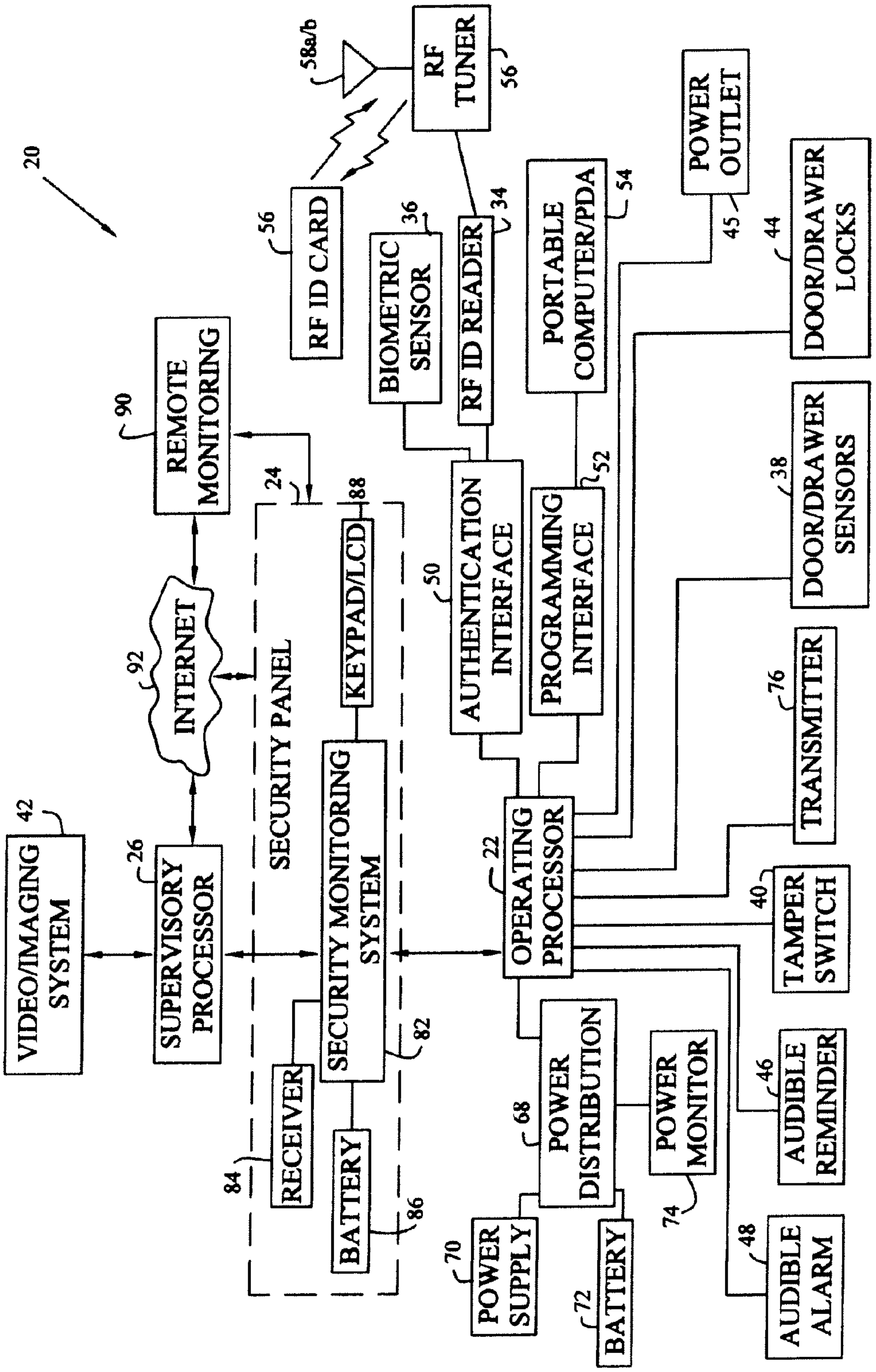
FIG. 1 is a schematic block diagram of a first embodiment of a workspace security system in accordance with the present invention.
Figure 2A:
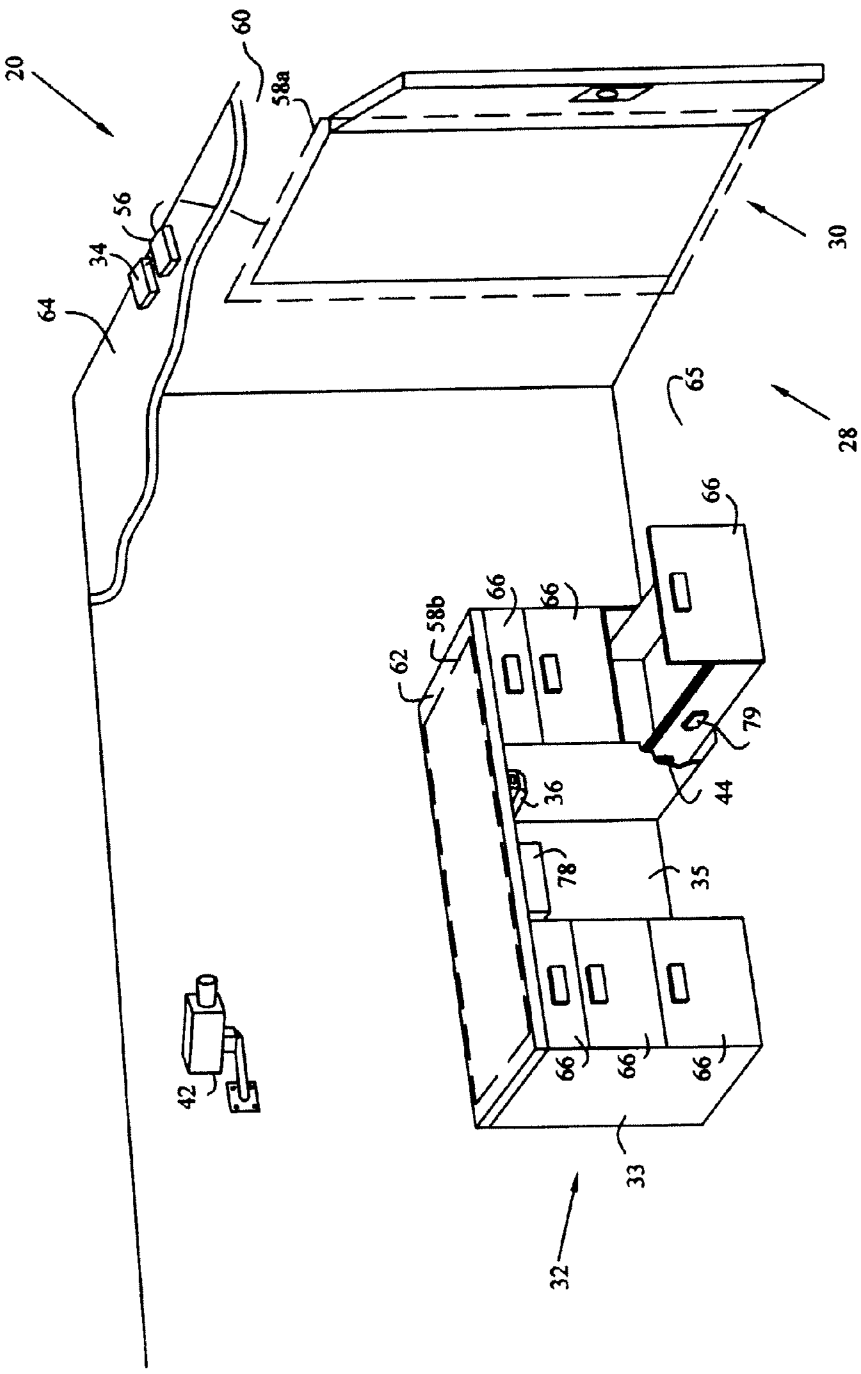
FIG. 2A is a perspective view of the workspace security system of FIG. 1, showing an exemplary workspace and office furniture component.

A first exemplary embodiment of workspace security system 20 is shown in FIGS. 1 and 2A. Referring to FIG. 1, system 20 generally includes operating processor 22, security panel 24, and supervisory processor 26. Security panel 24 includes communication links with operating processor 22 and supervisory processor 26. Referring to FIG. 2A, system 20 may be used for security monitoring of work area 28, which includes entryway 30 and office furniture component 32.

While system 20 may be directed to a single work area, for example, an office such as work area 28 shown in FIG. 2A, system 20 may also be directed to more than one work area. Work areas and equipment monitored and controlled by system 20 include but are not limited to buildings, HVAC systems, departments, building floors, rooms, doorways, windows, workstations, designated areas, office furniture components, utility carts, equipment, and materials. The work areas included in system 20 may include any one of or a combination of such work areas and equipment.

Operating processor 22, security monitoring system 82, and supervisory processor 26 produce responses to events, specifically, to signals received from monitored devices. Responses are based on programmed, logic, or analog processing. For example, processing rules or algorithms may include real-time, preplanned, or historical events. The processing may be localized to operating processor 22 or may be distributed across processor 22, security monitoring system 82, and processor 26.

In the case of the first exemplary embodiments, operating processor 22 monitors and controls access to work area 28 and furniture component 32. Referring to FIGS. 1 and 2A, monitoring components include access authentication devices such as radio frequency identification (RF ID) reader 34 and biometric sensor 36, door and drawer sensors 38, and imaging system 42. Components controlled by system 20 include imaging system 42, door and drawer locks 44, switch power outlet 45, which may be used to power and limit access to a computer monitor, audible reminder sounder 46, and audible alarm sounder 48.

Other monitoring devices connected to processor 22 or other components of system 20 may include, by way of example, motion detectors, proximity sensors, position or status sensors, imaging devices such as CCTV, and any other type of sensor known in the art. In addition to locking devices, system 20 may also control various other actuators, warning devices, access control devices, and systems, such as, for example, computer equipment, entry door locks, ventilation, lighting, and energy management controls.

In order to monitor personnel accessing work area 28, system 20 includes access authentication devices 34 and 36. Access authentication devices 34, 36, identify designated personnel or equipment located in or transiting the work area. Access authentication devices 34, 36 may be biometric, electronic, electromechanical, magnetic, or any other type device known to a person skilled in the applicable art. Access authentication devices 34, 36 may be active or passive. Illustrative active devices include card readers, keyboards, keypads, and biometric devices such as voice recognition devices, facial recognition devices, hand geometry recognition devices, iris or retinal scanning devices, and fingerprint reading devices, for example. Illustrative passive devices include image recognition devices or radio frequency identification devices.

In the first exemplary embodiment access authentication devices include RF ID reader 34 and biometric sensor 36 which are coupled to authentication interface 50 and provide authentication codes to processor 22. Processor 22 may be programmed through programming interface 52 by a portable computer, personal data assistant ("PDA") or other data transfer device 54, with authorized authentication codes and access rights associated with each particular codes. Each code may be associated with RF ID credential 56 which is assigned to a person, or to a corresponding code generated by a biometric sensor 36 upon a person presenting a personal biometric to the sensor, for example, their fingerprint. For example, RF ID credential 56 may include an access code, such as a binary code associated with a fingerprint of an authorized user, which code is also stored in processor 22. In the manner discussed below, the user may place their finger on a fingerprint reading device to generate a corresponding binary code which, when matched with the stored code in processor 22 corresponding to the access code of RF Id credential 56, allows access to one or more utility components such as office furniture component 32. Also, a code assigned to one individual may provide access rights to work area 28 but not office furniture component 32, while a code assigned to another individual provides access rights to both work area 28 and office furniture component 32.

A person carrying an authorized RF ID credential 56, usually in the form of a card having a powered or unpowered RF transponder, may be detected by system 20 as they enter a portal providing access to work area 28. For example, entryway 30 which is equipped with RF ID reader 34 coupled to RF tuner 56 and antenna 58*a*. Advantageously, RF ID credential 56 may be an existing credential used for other security access, for example, building perimeter access.

As shown in FIG. 2A, antenna 58*a* may be embedded in wall 60 around entryway 30, forming a reception field that captures all RF ID credentials 56 passing through entryway 30 while entering or exiting work area 28. RF ID reader 34 and RF tuner 56 may advantageously be located in ceiling 64 or another discrete location within work area 28.

The entry portal therefore provides system 20 with detection and identification of personnel upon exit and entry of work area 28. Alternatively, antenna 58*b* may be embedded in work surface 62, end panel 33, modesty panel 35 or some other portion of furniture component 32, and coupled to RF tuner 56 and RF ID reader 34, thereby providing a reception envelope around furniture component 32. Antenna 58*b* may also be located in another furniture component (not shown), ceiling 64, flooring 65, or another location within work area 28.

For either antenna configuration, RF ID reader 34 periodically polls for RF ID credentials 56 by transmitting an interrogation signal. RF ID credentials 56 that are within the antenna's reception field will respond with an authentication code which is provided to operating processor 22, for example in a standard Wiegand data format, for determination of access rights. Advantageously, RF tuner 56 provides resistive and capacitive tuning of antenna 58*a* or 58*b* for adjustment of the transmission and reception field provided by antennas 58*a* or 58*b*. With such a configuration, operating processor 22 is capable of determining when personnel carrying in RF ID credential 56 enter or exit entryway 30 or approach or depart the vicinity of office furniture component 32. An exemplary RF ID reader is Part No. CR1A, available from Identec Limited, of Durham County, England. An exemplary RF ID credential is Part No. TC1, available from Identec Limited.

Office furniture component 32 includes work surface 62 and movable access components, such as cabinets with doors or drawers 66, as shown in FIG. 2A. Control enclosure 78, located, for example, under work surface 62, houses operating processor 22 and other components of system 20, such as power distribution module 68, power supply 70, battery 72, power monitor 74, transmitter 76, audible alarm 48, audible reminder 46, authentication interface 50, programming interface 52, switched power outlet 45, and enclosure tamper switch 40. Also located under work surface 62 or another convenient location associated with office furniture component 32, is biometric sensor 36. Biometric sensor 36 may be, for example, a fingerprint reader or other such device using biometric measurements to authenticate the identity of an individual desiring access to drawers 66 or other movable access components of office furniture component 32. An exemplary biometric sensor is Part No. V-PASS-A, available from Bioscrypt, of Van Nuys, Calif.

Figure 2B:
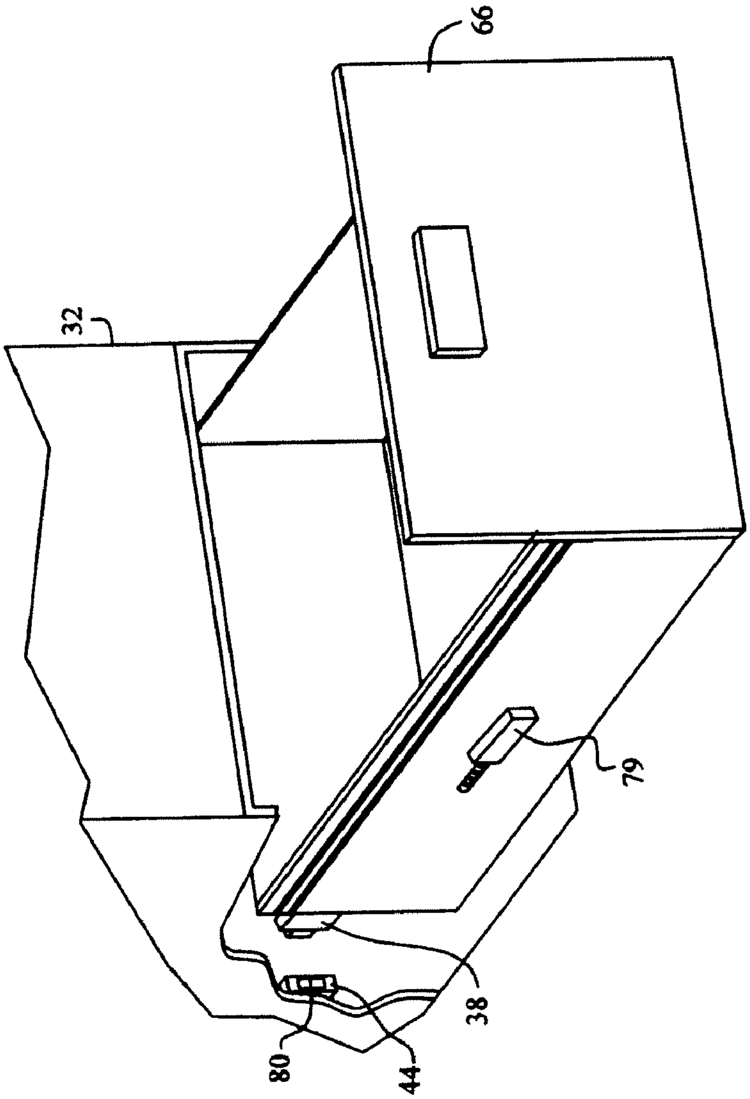
FIG. 2B is a perspective view of a portion of the office furniture component shown in FIG. 2A.

Referring to FIG. 2B, each drawer 66 may include a drawer sensor 38 and drawer locking element 44. In the first exemplary embodiment, drawer sensor 38 is a plunger type electromechanical switch which contacts an interior portion of office furniture component 32, activating the switch, when drawer 66 is in a closed position. An exemplary switch is Part No. 955, available from Ademco of Long Island, N.Y. Alternatively, drawer sensor 38 may include a magnet or other type sensor or switch capable of indicating the position of drawer 66.

In the exemplary embodiment drawer locking element 44 is an electromechanical pin bolt lock having pin bolt 79 attached to the side of drawer 66 and receptacle 80 attached to the interior cavity that receives drawer 66. When drawer 66 is in the closed position, a portion of pin bolt 79 is received into receptacle 80. Pin bolt 79 is free to be withdrawn from receptacle 80 when power is supplied to drawer lock 44, allowing drawer 22 to be moved from a closed position to an open, accessible position. When power is removed from drawer lock 44, receptacle 80 engages pin bolt 79, locking drawer 66 in a closed, inaccessible position. An exemplary pin bolt lock is Part No. EFL1, available from Hafele America Co. of Archdale, N.C.

Advantageously, drawer sensor 38 may be adjusted such that drawer 66, which is locked by drawer lock 44, provides enough motion to momentarily actuate drawer sensor 38 if an individual attempts to open drawer 66 while drawer lock 44 is locked, thus providing a signal to operating processor 22 for detection of an attempted unauthorized entry. Also, tamper switch 40 may be mounted in enclosure 78, or some other component of system 20, such that operating processor 22 detects an attempt to access components of system 20.

Referring to FIG. 1, operating processor 22 includes software enabling processor 22 to monitor authentication codes received from RF ID reader 34 and biometric sensor 36 and to accordingly lock or unlock drawer locks 44, sound audible reminder 46 and audible alarm 48, and provide signals to transmitter 74 to be received by security panel 24.

Operating processor 22 is powered by AC power supply 70, and backup battery 72. Advantageously, power monitor 74 may be provided for monitoring the power available from power distribution module 68 and to transmit a battery in use or low battery signal in the event of an AC power failure.

In the first exemplary embodiment, operating processor 22 may be a computer, programmable logic controller (PLC), microcontroller, analog circuit, or other logical devices. Operating processor 22 also includes hardware or software to provide various operating states, for example: LOCK, UNLOCK, ALARM, LOITER, and WARNING. The LOCK state is selected by operating processor 22 when no authorized RF ID credential is received when RF ID reader 34 polls for one. The UNLOCK state is selected by processor 22 upon receiving and verifying access rights for authentication codes from RF ID reader 34 and biometric sensor 36. RF ID reader 34 sends an authentication code to processor 22 after receiving a polling response from RF ID credential 56. Biometric sensor 36 sends an authentication code to processor 22 after authenticating a fingerprint matching those previously authorized for biometric sensor 36. In the UNLOCK state, operating processor 22 unlocks drawer locks 44.

The WARNING state may be selected by processor 22 upon system 20 having been in the UNLOCK state and either RF ID reader 34 no longer receiving an authorized authentication code upon polling, for example, the individual carrying RF ID credential 56 has walked away from office furniture component 32, or RF ID reader detects an individual carrying RF ID credential 56 exiting workspace 28 via entryway 30. In the WARNING state, processor 22 may sound audible reminder 46 if drawer sensors 38 indicate any of drawers 66 are in an open position. Additionally, regardless of the position of drawers 66, after a preset period of time, if RF ID reader 34 does not again receive the authorized authentication code from RF ID credential 56, operating processor 22 may select the LOCK state, locking drawer locks 44. Advantageously, the LOCK state may also turn on switched power outlet 45 which powers a lamp or other visual indicator for convenient visual verification by security personnel that operating processor 22 has locked office furniture component 66. Alternatively, the LOCK state may instead turn off switched power outlet 45 to turn off a light, computer monitor, or other device.

In the event one of drawer sensors 38 indicates a drawer 66 is in the open position, operating processor 22 may select the ALARM state, sound audible alarm 48, and/or provide a state or event signal indicating an open drawer 66 to another component of system 20, such as security panel 24.

In the event that tamper switch 40 is activated or drawer sensors 38 are momentarily activated, detecting an attempt to open drawer 66 while in process 22 is in the LOCK state, i.e., proper authentication has not been provided by RF ID reader 34 and biometric sensor 36, processor 22 may select an alarm state, sounding audible alarm 48 and providing an event signal via transmitter 76 to security panel 24.

The LOITER state may be selected by processor 22 upon system 20 having been in the LOCK state and motion being detected without RF ID reader 34 receiving an authorized authentication code upon polling. Such an occurrence would be, for example, an individual entering work area 28 who is not carrying an RF ID credential 56 or whose credential 56 is not authorized for work area 28. In the LOITER state, processor 22 may monitor motion for a preset time, and, if motion is still detected, then processor 22 may select the ALARM state and sound audible alarm 48.

An exemplary operating processor 22 is Part No. MM443S, manufactured by ELK Products, Inc., of Hildebran, N.C., and enabled by software available from Savoy WebEngines, Inc., of Westboro, Mass. Other related components coupled to operating processor 22 and available from ELK include power supply 70, Part No. P421, power distribution module 68, Part No. 967, and authentication interface 50, Part No. MA290.

Referring again to FIG. 1, security panel 24 may be an existing building security panel, or may be a security panel dedicated to system 20. Security panel 24 includes security monitoring system 82 and may also include receiver 84, backup battery 86, and programming keypad and LCD 88. Security panel 24 provides RF communication with operating processor 22 via transmitter 76 and receiver 84, is interfaced with supervisory processor 26 via a dedicated, network, or other communications link, and may provide remote notification and monitoring services via a telecommunications network or the Internet. Alternatively, operating processor 22 may be hardwired to security panel 24 through a network or dedicated communication connection, or operating processor 22 may be directly coupled to supervisory processor 26 via a network, Internet, or other connection. Communication between security panel 24 and other components of system 20 may be encrypted for added security.

Security panel 24 monitors the operating state of operating processor 22 and may provide alarm and other notification messages to supervisory processor 26 and, via a telecommunications connection, may provide e-mail, paging, and other remote messaging notifications. Security panel 24 may also be capable of recognizing and automatically enrolling additional operating processes 22 that are added to system 20 for monitoring additional work areas 28. Additionally, security panel 24 may include a building security system, including existing audible and remote alarm and other security notification components. Advantageously, security "zones" used in standard security panels may be used to identify and communicate the operating state for operating processor 22. sAn exemplary security monitoring system 82 and associated components is Gemini Part No. GEM-P9600, available from NAPCO Security Systems, Inc., of Amityville, N.Y.

Supervisory processor 26 may be a Windows or network based PC, or other processor system that provides monitoring and control of imaging system 42, security panel 24, and operating processor 22. Additionally, supervisory processor 22 may be Web enabled, providing remote monitoring and control access of system 20 by remote monitoring processor 90 through Internet 92. For example, remote monitoring processor 90 may be used to provide access to off-site security personnel in the event of an alarm or other events occurring in work area 28 that require a response. In the exemplary embodiment Savoy Console and WebEngine software by Savoy WebEngine, Inc., of Westboro, Mass., provide a graphical interface for supervisory processor 26 for monitoring and control of components of system 20.

Supervisory processor 26 may also provide control of imaging system 42, which includes a CCTV or other imaging device. For example, supervisory processor 26 includes image handling software or hardware for receiving, processing, storing and displaying video or other image formats. Processing capabilities may also include image recognition, storage of images received from imaging system 42 upon operating processor 22 selecting the ALARM state, and pan, tilt and zoom control of imaging system 42, if so equipped. Supervisory processor 26 also may provide a user with historic search and review capability to view stored images and events received by supervisory processor 26.

Although FIG. 2A shows imaging system 42 located within work area 28, alternatively, imaging system 42 could be located outside work area 28 and directed toward entryway 30, thus providing additional privacy for individuals working within work area 28 while monitoring those individuals entering or leaving through entryway 30. Although the first exemplary embodiment of system 20 includes security panel 24 and operating processor 22, alternatively, imaging system 42 and supervisory processor 26 may operate independent of the other components of the first embodiment of system 20.

An exemplary scenario utilizing system 20 shown in FIGS. 1, 2A, and 2B is as follows. As an individual passes through entryway 30 to enter work area 28 containing office furniture component 32, operating processor 22 received an authentication code read by RF ID reader 34 from RF ED card 56 carried by the individual, and using antenna 58*a*, which is embedded in wall 60 surrounding entryway 30. Reception of an authentication code may be used to stop or start storing images sent to supervisory processor 26 by imaging system 42, and may also be used to control environmental controls, such as lights and HVAC settings.

To access drawers 66, the individual presents a fingerprint to biometric sensor 36. Biometric sensor 36 sends a corresponding code or data set to operating processor 22. Processor 22 verifies access rights of the individual, and if access is granted, unlocks drawer locks 44 so that drawers 66 may be accessed. When operating processor 22 receives the individual's authentication code from RF ID reader 34 once again, the individual has departed through entryway 30 and operating processor 22 will lock drawer locks 44. If one of drawers 66 is in an open position, as indicated by drawer sensor 38, and cannot be locked, operating processor 22 sounds audible reminder 46 to alert the departing individual of the insecure drawer. If open drawer 66 is not closed, after a preset delay, operating processor 22 will sound audible alarm 48 and notify security monitoring system 82 of the alarm, and supervisory processor 26 will store images received from imaging system 42.

Alternatively, RF ID card 56 may be polled and an authorization code received through antenna 58*b*, which is embedded in a portion of office furniture unit 32. With this configuration, lockdown of drawers 66 occurs when RF ID reader 34 no longer received the authorization code when polling, thus indicating the individual has left the immediate vicinity of office furniture unit 32.

Figure 3A:
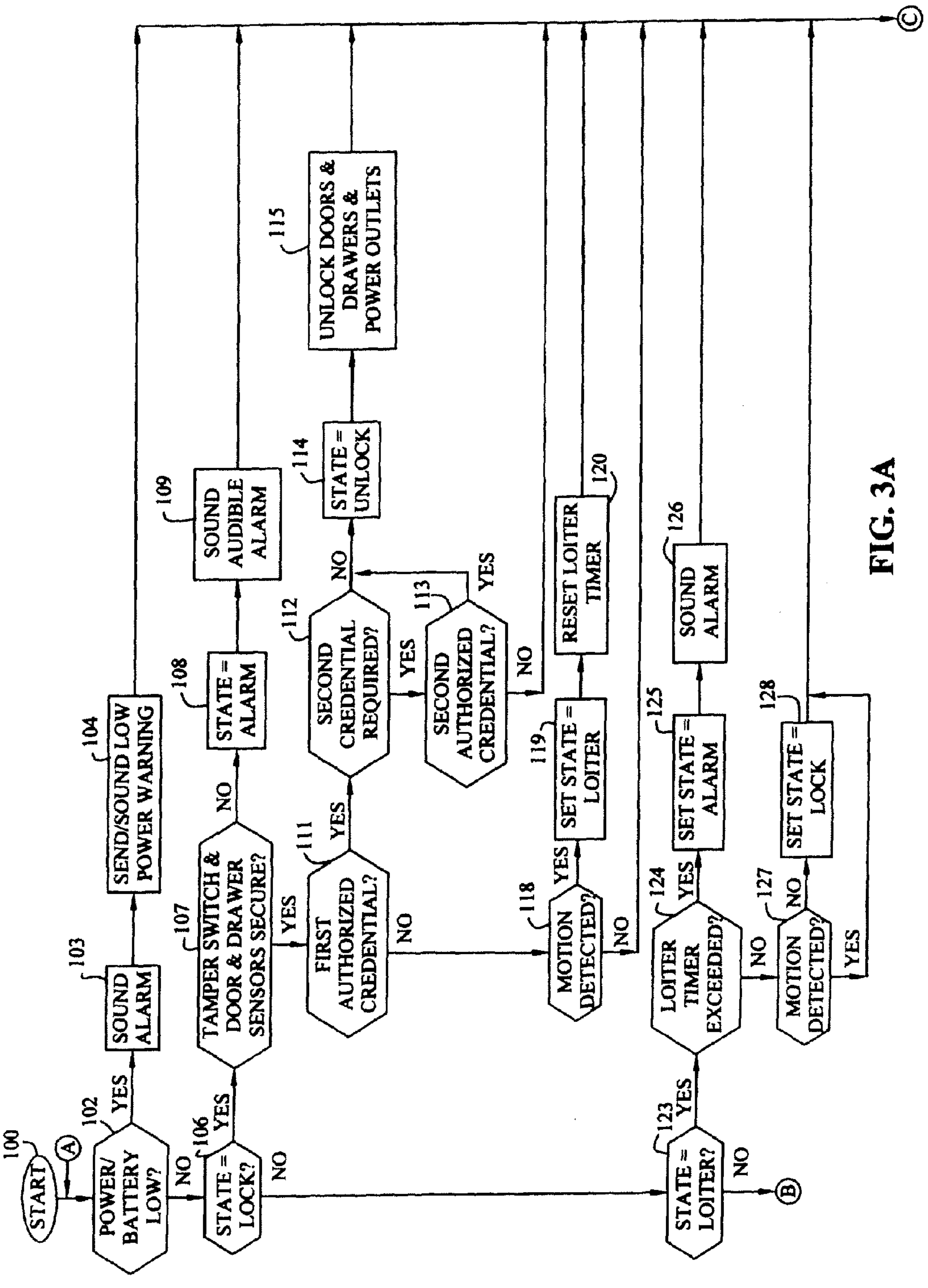
FIGS. 3A and 3B are flowcharts illustrating a subroutine for the operating processor of the workspace security system of FIG. 1.

Referring to FIG. 3A, subroutine 100 is an exemplary software subroutine for operating processor 22. Alternatively, subroutine 100 or any portions thereof may also be associated with security panel 24, supervisory processor 26, or another component of system 20. Subroutine 100 provides monitoring and control of work area 28 and office furniture component 32, authentication of credentials, and reporting of events to security monitoring system 82 and supervisory processor 26.

Figure 3B:
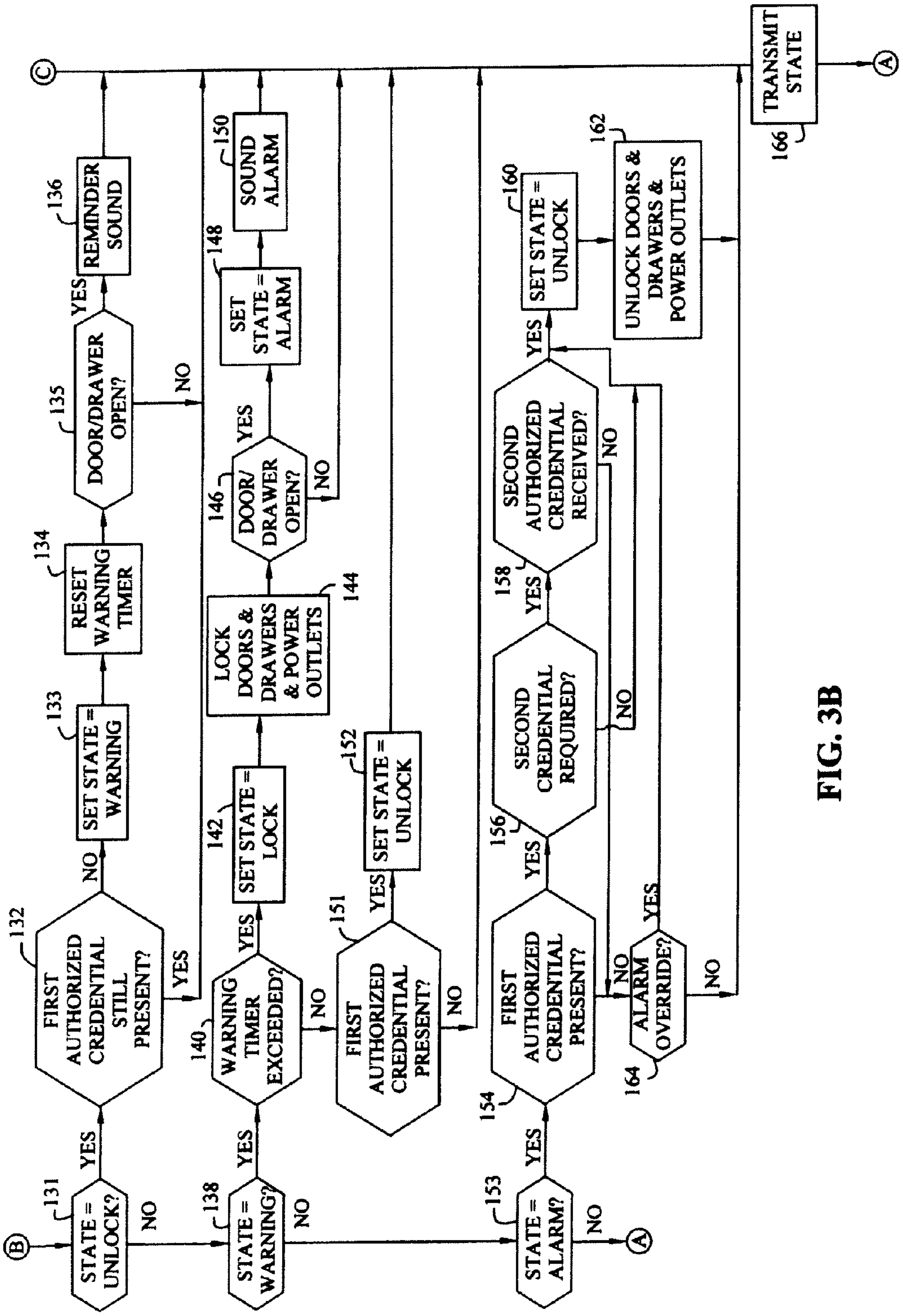

Referring generally to FIG. 3A and also to FIGS. 1, 2A, and 2B, in step 102, processor 22 determines whether a low power signal is received from power monitor 74. If so, step 103 is completed, else step 106 is completed. In step 103, operating processor 22 sounds a power alarm, such as audible reminder 46. In step 104, operating processor 22 sends a lower power warning, for example, to security monitoring system 82 or supervisory processor 26. After step 104 is completed, step 166, shown in FIG. 3B, is completed to transmit the current operating state to security monitoring system 82 via transmitter 76.

If in step 102 it is determined that no low power signal is received, then step 106 is completed. In step 106, operating processor 22 determines whether the operating state=LOCK. If in step 106 it is determined that the operating state=LOCK, then step 107 is completed, else step 123 is completed. In step 107, operating processor 22 determines whether a signal is received from tamper switch 40 indicating enclosure 78 is not secure, or from drawer sensor 38 indicating one of drawers 66 is not secure. If operating processor 22 determines tamper switch 40 or drawer sensor 38 indicates a nonsecure condition, step 108 is completed, else step 111 is completed. In step 108 operating processor 22 sets operating state=ALARM. In step 109, operating processor 22 sounds audible alarm 48. After step 109, step 166 (FIG. 3B) is completed.

If in step 107 it is determined that enclosure 78 and drawer 66 are secure, then step 111 is completed. In step 111, operating processor 22 determines whether an authorized credential is received from RF ID reader 34. If so, step 112 is completed, else step 118 is completed. In step 112, processor 22 determines whether a second authorized credential is required according to preset programming or access rights. If so, step 114 is completed, else step 113 is completed. In step 113, processor 22 determines whether an authorized credential is received from biometric sensor 36. If so, step 114 is completed, else step 166 is completed. If all required authorized credentials have been received, in step 114 processor 22 sets operating state=UNLOCK. In step 115, operating processor 22 unlocks drawer locks 44 and powers switch power outlet 45. After step 115, step 166 is completed (FIG. 3B).

If in step 111 processor 22 determines that a first authorized credential is not present, then step 118 is completed. In step 118, processor 22 determines whether motion is detected. Motion may be detected by imaging system 22, a motion sensor, or some other indication of the presence of an individual. If motion is detected, then step 119 is completed, else step 166 is completed (FIG. 3B). In step 119, processor 22 sets operating state=LOITER. In step 120, operating processor 22 resets a LOITER timer. The LOITER timer uses a preset period of time, for example, 30 seconds, during which a person not carrying an authorized RF ID credential 56 may be present in work area 28 before operating processor 22 set state=ALARM. After step 120 is completed, step 166 is completed.

If in step 106 processor 22 determined that operating state≠LOCK, step 123 is completed. In step 123, operating processor 22 determines whether operating state=LOITER. If so, step 124 is completed, else step 131 (FIG. 3B) is completed. In step 124, operating processor 22 determines whether the LOITER timer has exceeded the preset period of time. If so, then step 125 is completed, else step 127 is completed. In step 125, operating processor 22 sets operating state=ALARM. In step 126, operating processor 22 sounds audible alarm 48. After step 126 is completed, step 166 is completed (FIG. 3B).

If in step 124 it is determined that LOITER timer has not exceeded the preset period of time, then step 127 is completed. In step 127, processor 22 determines whether motion is still detected. If so, step 166 is completed, else step 128 is completed. If in step 127 no motion is detected, then in step 128 operating processor 22 sets state=LOCK. After step 128 is completed, step 166 is completed (FIG. 3B).

If in step 123 processor 22 determined that operating state≠LOITER, step 131 is completed. Referring to FIG. 3B, in step 131, operating processor 22 determines whether operating state=UNLOCK. If so, step 132 is completed, else step 138 is completed. In step 132, operating processor 22 determines whether first authorized credential, i.e., RF ID card 56, is still received by RF ED reader 34, or has not been received while exiting entryway 30. If so, then the individual carrying RF ID card 56 is still within the reception area of antenna 58*b*, around office furniture component 32 (FIG. 2A), or is still within work area 28, not having exited through the reception area of antenna 58*a* around entryway 30. If so, step 166 is completed, else step 133 is completed. In step 133, operating processor 22 sets operating state=WARNING. In step 134, operating processor 22 resets a warning timer. The warning timer uses a preset period of time, for example 60 seconds, during which the person carrying the authorized RF ID credential 56 may leave work area 28 or furniture component 32, before system 20 will secure work area 208 and furniture component 32. While operating state=WARNING, operating processor 22 may also increase the frequency that RF ID reader 34 polls for RF ID credential 56, for example, every 5 seconds. In step 135, processor 22 determines whether drawer sensor 38 indicates that one of drawers 66 is open. If so, in step 136, processor 22 sounds audible reminder 46, immediately reminding the departing individual that drawer 66 is open. Else, step 166 is completed. After step 136 is completed, step 166 is completed.

If in step 131 it was determined that operating state UNLOCK, then step 138 is completed. In step 138, processor 22 determines whether operating state=WARNING. If so, step 140 is completed, else step 153 is completed. In step 140, processor 22 determines whether the warning timer has exceeded the preset limit. If so, step 142 is completed, else step 151 is completed. In step 142, processor 22 sets operating state=LOCK. In step 144, operating processor 22 locks drawer locks 44 and switches off switched power outlet 45. In step 146, processor 22 determines whether drawer sensor 38 indicates that one of drawers 66 is still open. If so, step 148 is completed, else step 166 is completed. In step 148, because open drawer 66 can not be locked, processor 22 sets operating state=ALARM. In step 150, processor 22 sounds audible alarm 48. After step 150, step 166 is completed.

If in step 140 it is determined that the warning timer has not exceeded the preset time, then step 151 is completed. In step 151, processor 22 determines whether the first authorized credential is received. If so, step 152 is completed, else step 166 is completed. In step 152, operating processor 22 sets state=UNLOCK. After step 152 is completed, step 166 is completed.

If in step 138 it is determined that operating state≠WARNING, then step 153, shown in FIG. 3B, is completed. In step 153, processor 22 determines whether operating state=ALARM. If so, step 154 is completed, else subroutine 100 is repeated beginning at step 102, shown in FIG. 3A. In step 154, processor 22 determines whether first authorized credential, e.g., RF ID credential 56, is received by RF ID reader 34. If so, step 156 is completed, else step 164 is completed. In step 156, processor 22 determines whether preset preferences require a second authorized credential from biometric sensor 36 to access drawers 66. If so, step 158 is completed, else step 160 is completed. In step 158, processor 22 determines whether a second authorized credential is received from biometric sensor 36, e.g., an authorized fingerprint. If so, step 160 is completed, else step 164 is completed.

In step 164, processor 22 determines whether an alarm override signal is received from security panel 24 or supervisory processor 26. If so, step 160 is completed, else step 166 is completed. If all required credentials or an alarm override signal is received, then in step 160 processor 22 sets operating state=UNLOCK. In step 162, processor 22 unlocks drawer locks 44 and switches on power outlet 45.

In step 166, processor 22 transmits the current operating state via transmitter 76 to security monitoring system 82. After step 166 is completed, subroutine 100 is repeated beginning with step 102 shown in FIG. 3A.

Figure 4:
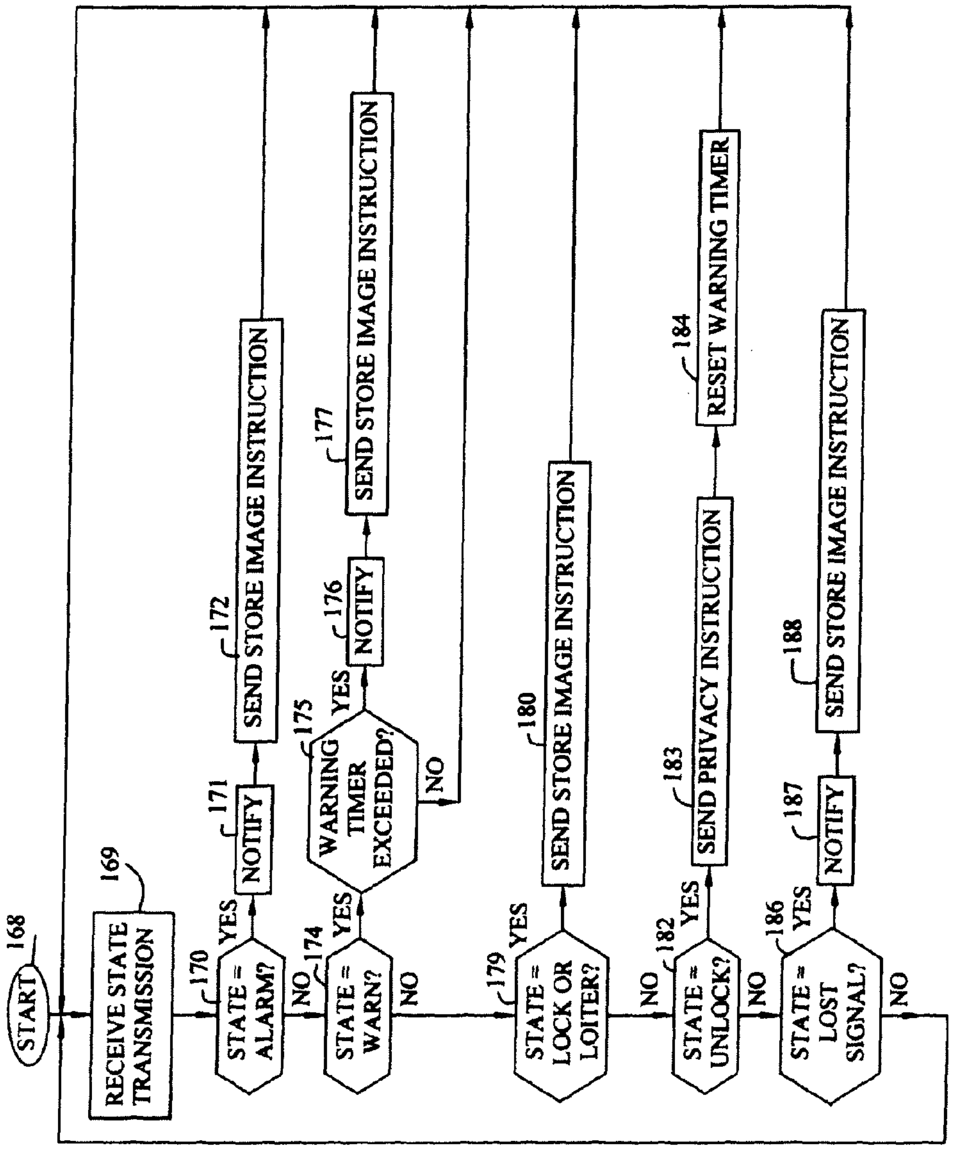
FIG. 4 is a flowchart illustrating a subroutine for the security processor of the workspace security system of FIG. 1.

Referring to FIG. 4, subroutine 168 may be implemented as software in security monitoring system 82, or another component of system 20 for monitoring operating processor 22, sending notification messages via a telecommunications network, and communicating with supervisory processor 26.

In step 169, system 82 receives an operating state transmission via receiver 84 from operating processor 22. In step 170, system 82 determines whether the received operating state=ALARM. If so, step 171 is completed, else step 174 is completed. In step 171, system 82 sends a notification message of the current operating state. Notification messages may consist of a transmitted data communication, for example, in the form of an e-mail or page, or may be in the form of data communication to a connected system, for example, supervisory processor 26 or remote monitoring system 90. In step 172, system 82 sends a STORE IMAGE instruction to supervisory processor 26, instructing processor 26 to store images received from imaging system 42. After step 172 is completed, subroutine 168 is repeated beginning at step 169.

If in step 170 it is determined that operating state≠ALARM, then in step 174 system 82 determines whether state=WARNING. If so, step 174 is completed, else step 179 is completed. In step 175, system 82 determines whether a warning timer has exceeded a preset time. Alternatively, a warning timer may instead be implemented in operating processor 22. If in step 175 system 82 determines the warning timer has exceeded the preset time, step 176 will be completed, else subroutine 168 will be repeated beginning at step 169. In step 176, system 82 sends a notification message of the current operating state=WARNING. In step 177, system 82 sends a store image instruction to supervisory processor 23. After step 177 is completed, subroutine 168 is repeated beginning at step 169.

If in step 174 system 82 determines the current operating state≠WARNING, in step 179 system 82 determines whether operating state=LOCK or LOITER. If so, step 180 is completed, else step 182 is completed. In step 182, system 82 sends a store image instruction to supervisory processor 26. After step 180 is completed, subroutine 168 is repeated beginning at step 169.

If in step 179 system 82 determines operating state≠LOCK or LOITER, then in step 182 system 82 determines whether state=UNLOCK. If so, step 183 is completed, else step 186 is completed. In step 183, system 82 sends a privacy instruction to supervisory processor 26. The privacy instruction may, for example, instruct supervisory processor 26 not to display or store images from imaging system 42. In step 184, system 82 resets the warning timer. After step 184 is completed, subroutine 168 is repeated beginning at step 169.

If in step 182 system 82 determines state≠UNLOCK, then in step 186 system 82 determines whether state=LOST SIGNAL. If so, step 187 is completed, else subroutine 168 is repeated beginning at step 169. In step 187, system 82 sends a notification message that state=LOST SIGNAL. In step 188, system 82 sends a store image instruction to supervisory processor 26. After step 188 is completed, subroutine 168 is repeated beginning at step 169.

Figure 5:
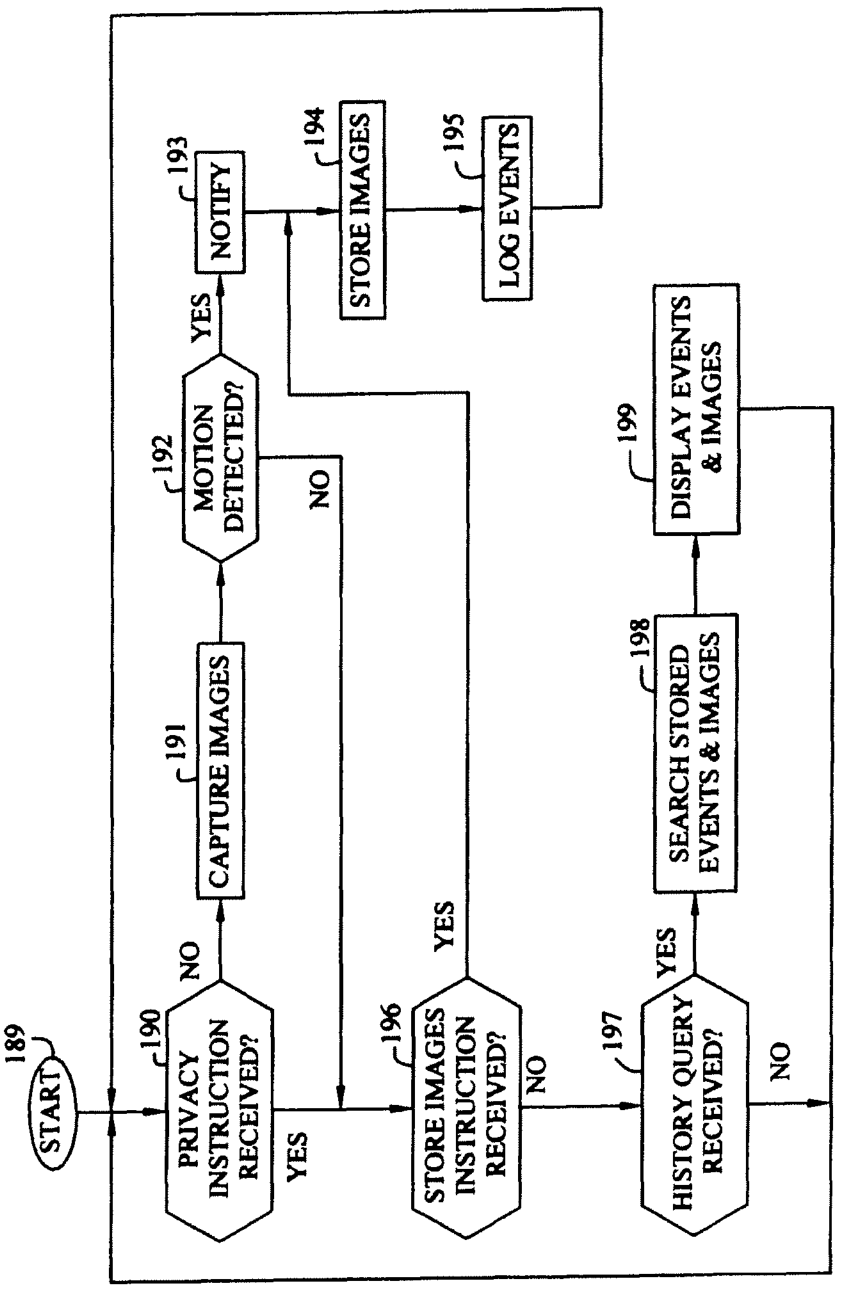
FIG. 5 is a flowchart illustrating a subroutine for the imaging device of the workspace security system of FIG. 1.

Referring to FIG. 5, subroutine 189 may be implemented as software in supervisory processor 26 or another component of system 20. In step 190, supervisory processor 26 determines whether a privacy instruction has been received. If so, step 196 is completed, else step 191 is completed. In step 191, supervisory processor 26 captures images received from imaging system 42. In step 192, supervisory processor 26 determines whether motion is detected, for example, by comparing the pixels of recent captured images. Alternatively, motion may be detected by a sensor or by imaging system 42. If in step 192 it is determined that motion is detected, step 193 is completed, else step 196 is completed. In step 193, supervisory processor sends a notification message that motion is detected, for example, to remote monitoring system 90 via Internet 92 and to operating processor 22. In step 194, supervisory processor 26 stores images received from imaging system 42. In step 195, supervisory processor 26 stores data regarding the motion detected event. After step 195 is completed, step 190 is completed.

In step 196, supervisory processor 26 determines whether a store image instruction has been received from security monitoring system 82. If so, step 194 is completed to store the images, else step 197 is completed.

In step 197, supervisory processor 26 determines whether a history query has been received, for example, from remote monitoring system 90, or from a user keyboard associated with supervisory processor 26. If so, step 198 is completed, else subroutine 189 is repeated beginning at step 190. In step 198, system 82 searches stored events and images according to the query received. In step 199, supervisory processor 26 displays the events and images resulting from the query search. After step 199 is completed, subroutine 189 is repeated beginning at step 190.

Figure 10:
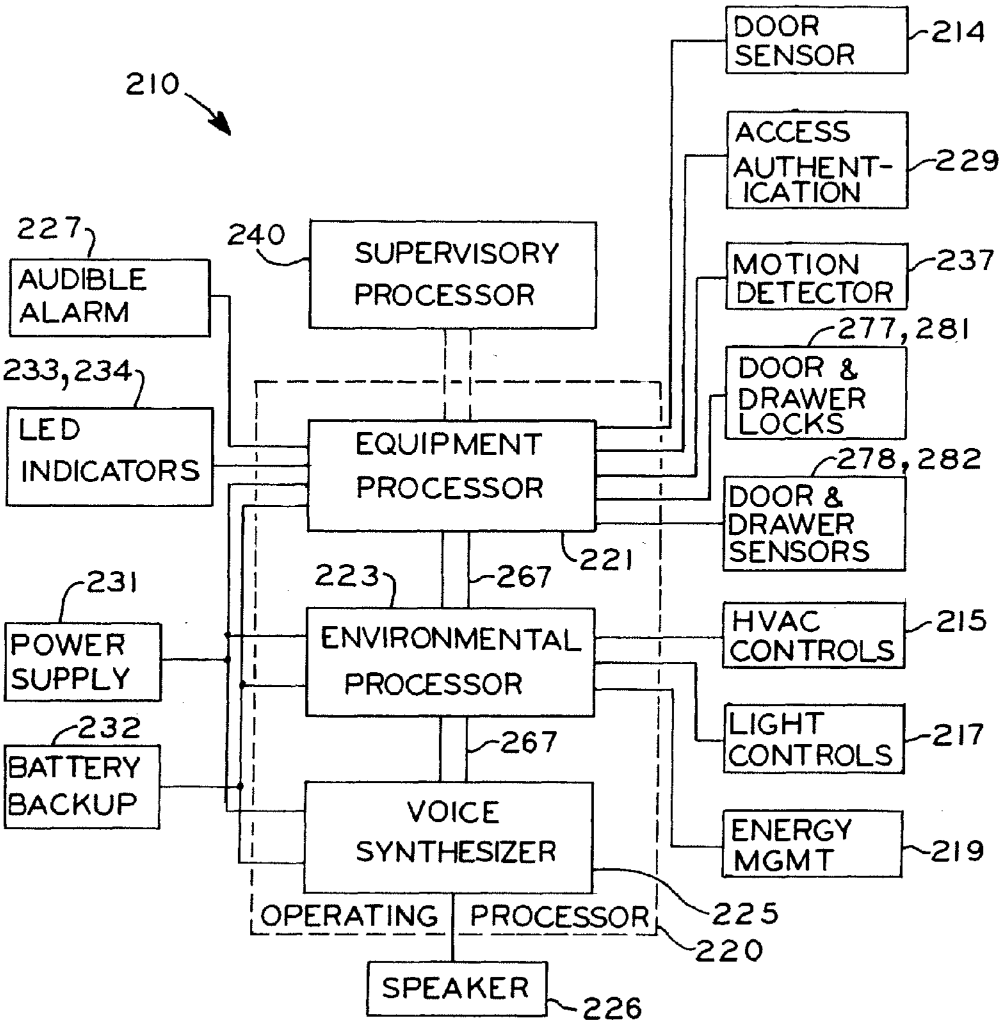
FIG. 10 is a block schematic diagram of the workspace security system shown in FIGS. 6-8.

A second exemplary embodiment of workspace security system 210 for monitoring at least one work area, including office furniture component 270, is shown in FIGS. 6-8 and 10. Referring to FIG. 10, system 210 includes operating processor 220, access authentication device 229, sensors 214, 237, 278 and 282 for monitoring work areas, actuators 215, 217, 219, 277 and 281 for controlling and automating work areas, indicators 226, 227, 233 and 234 for status and alarm notification, power supply 231, and battery backup 232. Operating processor 220 may include subprocessors, for example, equipment processor 221, environmental processor 223, and voice synthesizer processor 225. System 210 may also include supervisory processor 240 which is locally or remotely interfaced with operating processor 220.

Figure 6:
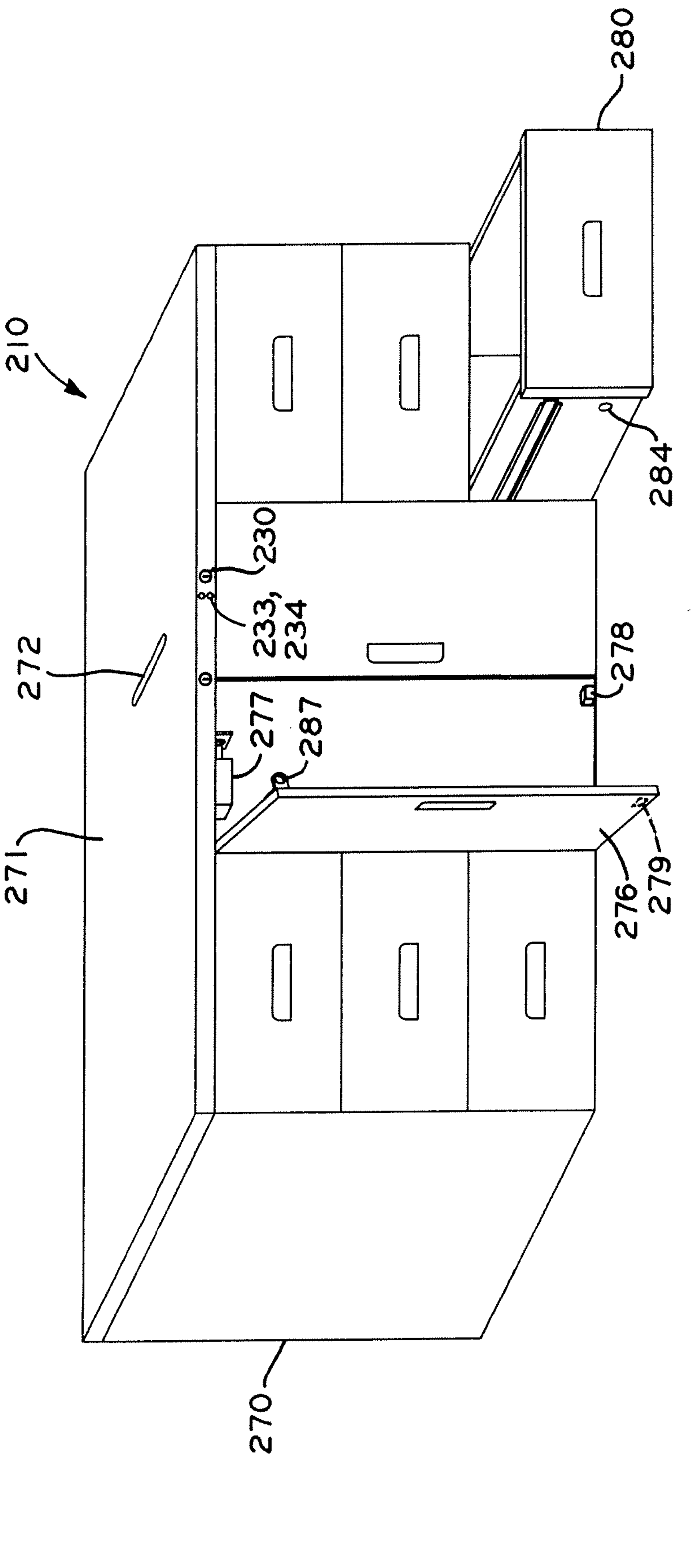
FIG. 6 is a perspective view of a second embodiment of a workspace security system associated with an exemplary office furniture component in accordance with the present invention.
Figure 11:
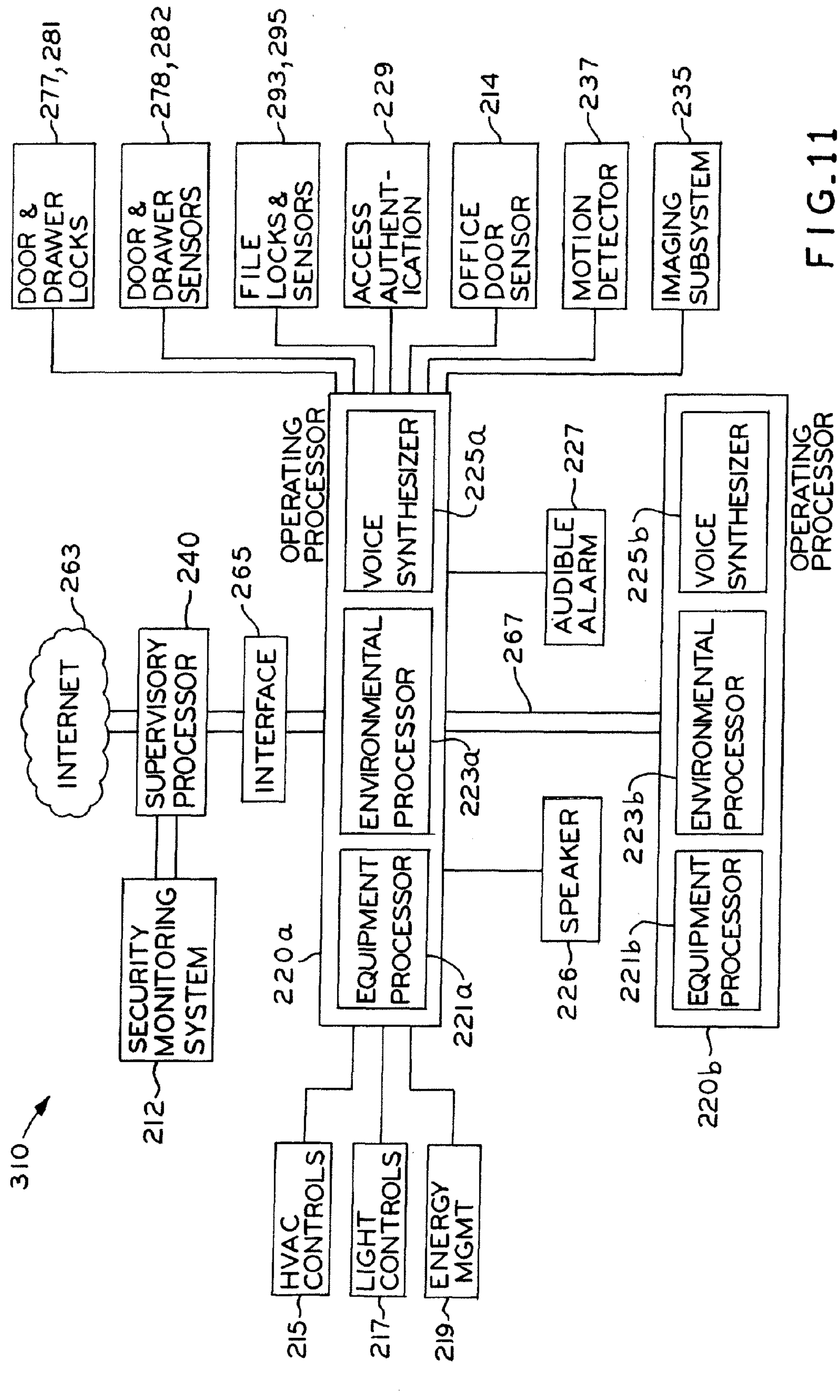
FIG. 11 is a schematic block diagram of a third embodiment of a workspace security system integrating two or more work-area subsystems.

Workspace system 210 may be directed to a single work area, for example, office furniture component 270 shown in FIG. 6. Alternatively, system 210 may be directed to more than one work area, with each work area optionally having an operating processor 220*a* and 220*b*, as shown in FIG. 11. Also, work areas may be geographically distributed, with operating processors 220*a*-220*e* being interfaced by network 261 and Internet 263, as in the fourth exemplary embodiment shown in FIG. 12.

Referring again to FIG. 10, in order to monitor the work areas included in system 210, the system includes a plurality of monitoring devices interfaced with operating processor 220. One type of device generally included in system 210 is access authentication device 229. Access authentication device 229 is connected to operating processor 220, or equipment processor 221, and identifies or authenticates persons seeking access to the monitored work area. In the second exemplary embodiment shown in FIG. 6, the system 210 includes access input device 230 for detecting a key fob (not shown), and is connected to access authentication device 229 shown in FIG. 7. Exemplary devices 229 and 230 support encrypted key access with a key fob (not shown) and include a secure microprocessor or microcontroller based system such as, for example, iButton™ MicroCan system by Dallas Semiconductor Corp. of Dallas, Tex., and iButton™ Interface, Model No. MA190 by ELK Products, Inc., of Hildebran, N.C.

Particular monitoring devices of system 210 may be connected to supervisory processor 240 instead of operating processor 220. Monitoring sensors connected to operating processor 220 in the exemplary embodiment shown in FIG. 10 are office door sensor 214, office furniture component door sensor 278, office furniture component drawer sensor 282, motion sensor 237, file cabinet drawer sensor 293, and imaging subsystem 235. The second exemplary embodiment shown in FIGS. 6-8 includes door sensors 278 and door sensor actuators 279 for each cabinet door 276, and drawer sensors 282 and drawer sensor actuators 284 for each drawer 280. An exemplary sensor for this embodiment is a reed switch actuated by the proximity of a magnetic actuator.

Operating processor 220 receives monitoring device signals from the various monitoring devices. The connection delivering these signals may be hard wiring, wireless, infrared, or any other signal conductor known in the art. Operating processor 220 may be a single processor or may consist of one or more subprocessors 221, 223 and 225. Operating processor 220 may include software and associated hardware, such as processor interconnection data bus 267 shown in FIG. 10.

Figure 12:
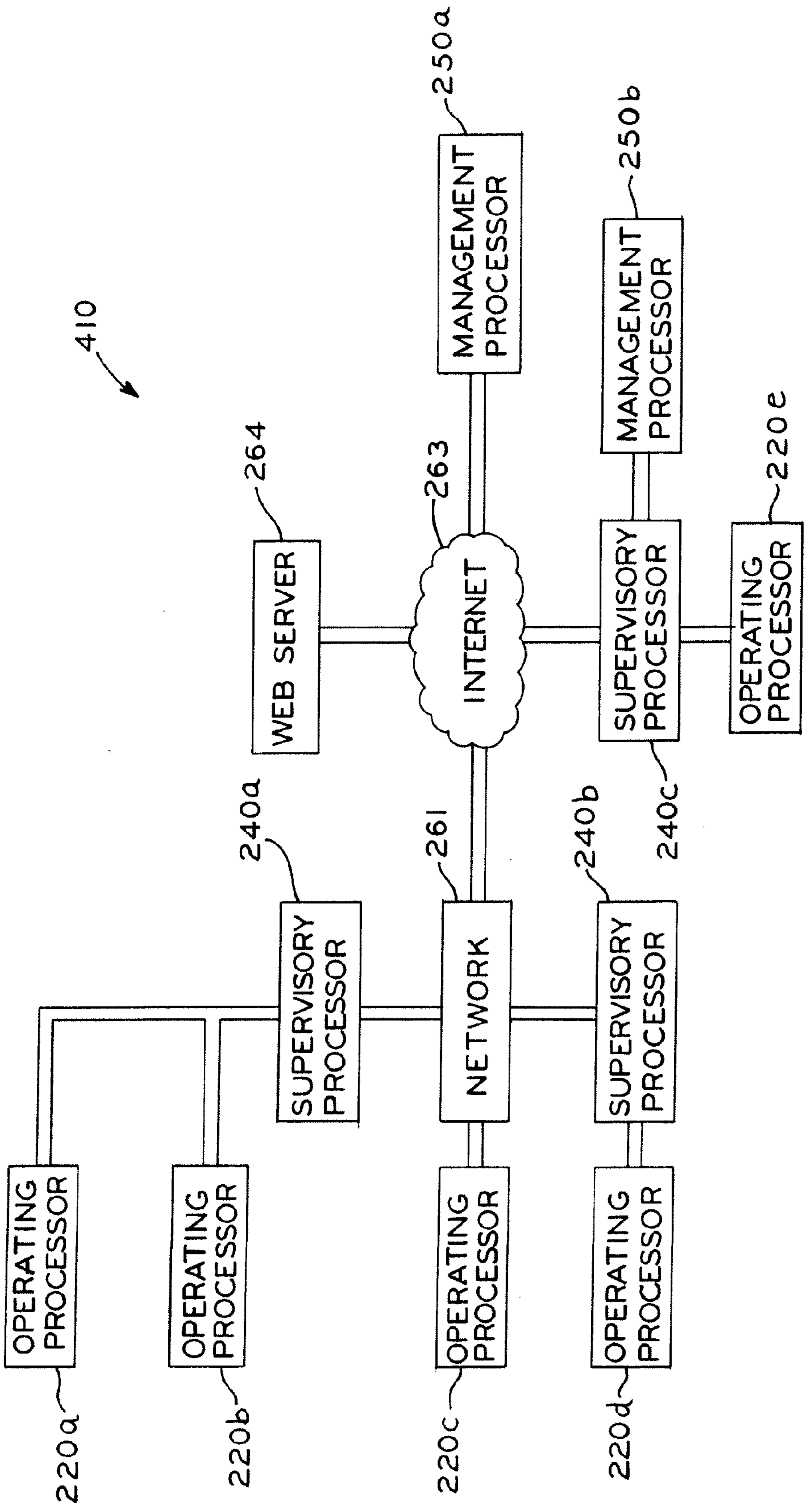
FIG. 12 is a schematic block diagram of a fourth embodiment of a workspace security system having multiple work-area subsystems geographically distributed at multiple work sites and interconnected via networks and the Internet.

Operating processor 220 may alone monitor, control, and automate the components of workspace system 210, as shown in FIG. 10, or may include supervisory processor(s) 240, management processor(s) 250, and network 261 and Internet 263 connections, as in system 310 and 410 shown in FIGS. 11 and 12.

Processors 220, 240 and 250 produce responses to events received as monitoring device signals. Responses are based on programmed, logic, or analog processing. For example, processing rules or algorithms may include real-time, preplanned, or historical events. The processing may be localized to operating processor 220 or may be distributed across various processors 220, 240 and 250. Interface network 261 used to transmit signals between various processors 220, 240 and 250 may be of any type known in the art, including local-area and wide-area networks, and hard-wired and wireless networks. Protocol interface 265, shown in FIG. 11, may be used to interconnect processors 220, 240 and 250, or other workspace system devices that utilize different interconnection protocols. For example, a RS-485 to RS-232 protocol interface advantageously connects operating processor 220 that is a PLC to a supervisor processor 240 that is a computer. An exemplary interface is Model No. MB485 manufactured by ELK Products, Inc.

The second exemplary embodiment shown in FIGS. 6-8 and 10 include operating processor 220 having equipment processor 221, environmental processor 223, and voice synthesizer processor 225. Each processor 221, 223 or 225 is dedicated to monitoring, controlling, and automating a specific aspect of the work area. In addition, redundant or backup processors (not shown) also may be directed to the same aspect of the work area. Exemplary processors 221, 223 and 225 for the second embodiment are Model Nos. MM443S, MV480, and MC100, manufactured by ELK Products, Inc.

Equipment processor 221 receives monitoring device signals from various monitoring devices including, for example, cabinet door sensor 278, drawer sensor 282, and access authentication subprocessor 229. Equipment processor 221 also controls various interconnected devices and systems, including, for example, cabinet door lock 277, drawer lock 281, audible alarm 227, access authentication subprocessor 229, LED indicators 233 and 234, and motion detector 237.

Environmental processor 223 monitors, controls, and automates environmental devices and systems. Environmental processor 223 may directly control environmental devices such as an air conditioner, heater, fan or lights 217, or may instead monitor and control systems such as an HVAC controller 215 or energy management system 219. System 210 may control any aspect of environmental conditions or energy management, and is generally directed to security, safety, efficiency, comfort and productivity.

Voice synthesizer processor 225 may be connected to speaker 226 to provide audible alarms and other notifications. Thus, personnel can be audibly apprised of conditions requiring notification or action. For example, if securing of office furniture component 270 shown in FIG. 6 is attempted by presenting a key fob (not shown) at access input device 230 while one of drawers 280 or cabinet doors 276 is open, equipment processor 221 can Embedded software is rules-based and enables processors 221, 223 and 225 to monitor device signals and to control the various devices and systems interconnected with each processor and enables communication across processor interconnection 267 and with processors 240 and 250. Exemplary embedded software for processors 221, 223 and 225 is Domains Manager by Savoy WebEngines, Inc., of Westboro, Mass.

As shown in FIG. 11, a third exemplary embodiment of system 310 may include imaging subsystem 235. Imaging subsystem 235 may be a CCTV or other imaging device and can be interfaced with processors 220, 240 and 250. For example, the third exemplary embodiment includes a bullet CCD camera.

Processors 220, 240 and 250 may include image handling software or hardware for receiving, processing, storing and displaying video or other image formats.

Referring now to FIG. 12, a fourth embodiment of system 410 is shown, in which operating processors 220*a*-220*e* may be located in various work sites in the same or different geographic locations. A particular operating processor such as 220*c* may be linked to other processors 240 and 250 through network 261. Alternatively, one operating processor 220*d* or 220*e* may be interconnected with a supervisory processor 240*b* or 240*c* which is in turn interfaced with network 261 or Internet 263. Also, multiple operating processors 220*a* and 220*b* may be connected to a single supervisory processor 240*a* which is in turn connected to network 261 or Internet 263. Supervisory processors 240 monitor and control operating processors 220. Supervisory processors 240 may advantageously include software applications and databases such as Windows-based Savoy Console, and Web-based applications such as Savoy WebEngine, in order to support Internet connection 263. Such software is available from Savoy WebEngines, Inc., of Westboro, Mass. Webserver 264 may be connected to Internet 263 for Internet browser access and security for system 410. Redundant network 261 or Internet 263 connections are also contemplated by the current invention.

Advantageously, exemplary software for processors 240 and 250 provide a graphical users interface typical of Windows-based software. The operator may establish or modify processing rules for any of processors 220, 240 or 250 by selecting the on-screen graphical representation of a device or system interfaced with system 410. After selecting the device or system, the exemplary software provides a list of rules from which the operator makes a selection. After selecting a rule, the operator then is prompted to select one or more graphically represented devices or systems that will be acted upon when the selected rule is satisfied. Exemplary software that provides such graphical user interface for establishing, monitoring, and editing rules-based processing for processors 220, 240 and 250 is Savoy Console and WebEngine by Savoy WebEngine, Inc., of Westboro, Mass.

System 410 may also include one or more management processor 250*a* and 250*b*. Management processors 250*a* and 250*b* provide overall system monitoring and control and interface directly with supervisory processors 240, through network 261, or via Internet 263. Processors 220, 240 and 250 have open access to all monitoring and control devices in the system 410 or may be restricted to particular processors and devices of the system according to predetermined authorization established for the accessing processor. In addition, processors 220, 240 and 250 may provide particular personnel, who have entered an authentication code, a predetermined range of access across workspace system 410.

Notification of particular monitoring and control events may occur in a number of ways. For example, processors 220, 240 and 250 may provide notification via indicator lights, audible alarm, telephone, pager, e-mail, security monitoring system, radio, or other hardware or software interface. The Console software application by Savoy WebEngines, for example, provides a graphics display of the various work areas included in system 410; thus, the location of a notification event can be quickly determined and system 410, including software or database applications, can be queried for further information related to the notification or other real-time, preplanned, or historical events.

Figure 7:
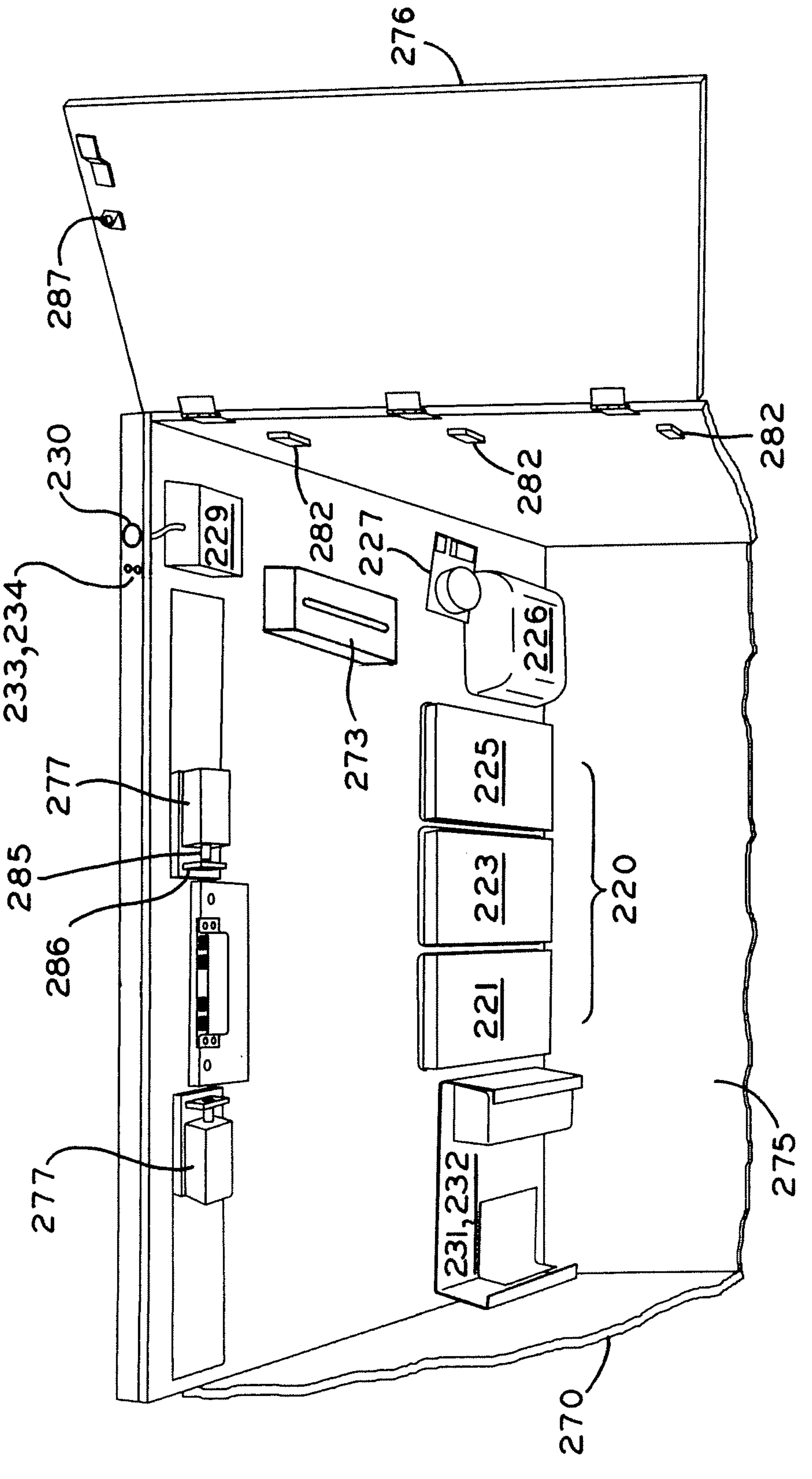
FIG. 7 is an interior view of a cabinet portion of the office furniture component of FIG. 6, showing various monitoring and control components of the workspace security system.
Figure 8:
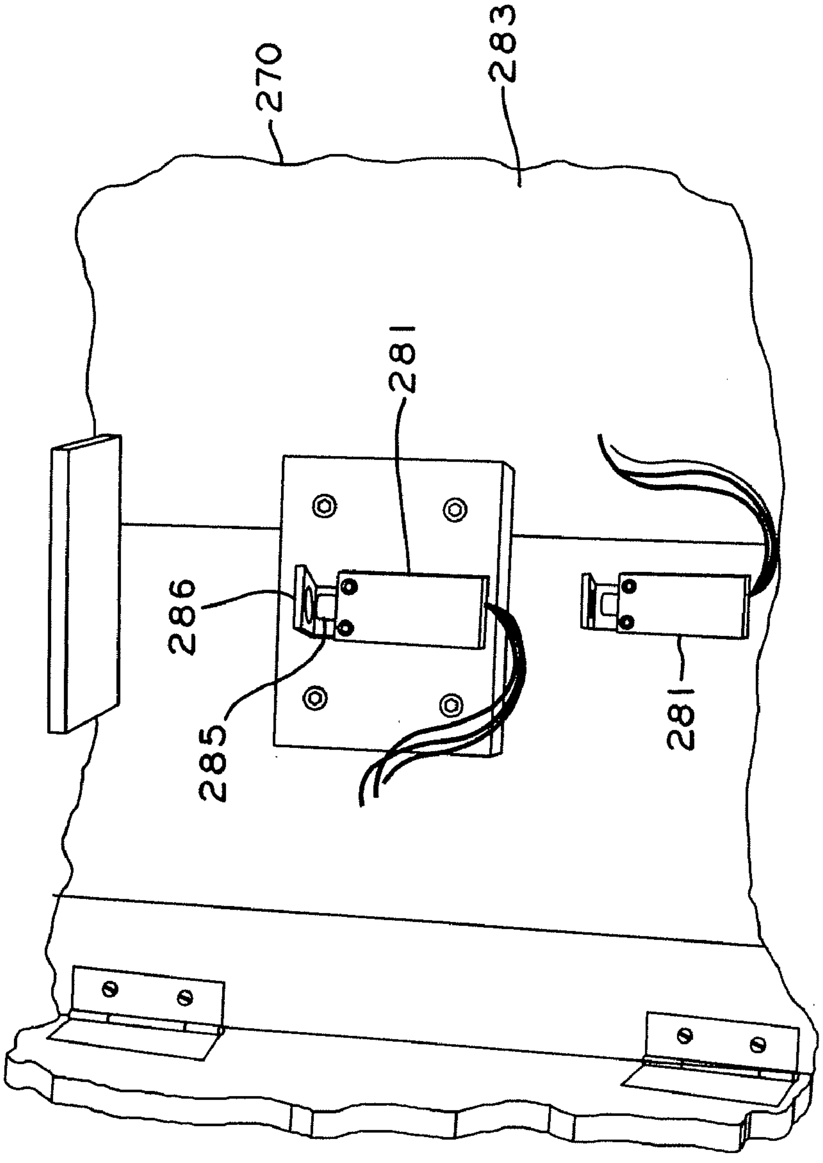
FIG. 8 is a view of an interior area behind the drawers of the office furniture component of FIG. 6, showing drawer locking devices.

Referring now to FIGS. 6-8, system 210 is shown, including an exemplary office furniture component 270 shown as a credenza. A row of drawers 280 is located on the left and right front side of office furniture component 270, and a cabinet with doors 276 is centrally located between the rows of drawers. A view of cabinet cavity 275 below work surface 271 with doors 276 open is shown in FIG. 7. Contained generally within cabinet cavity 275 are various components of system 210. Mounted to the underside of work surface 271 is power supply 231, battery backup 232, equipment processor 221, environmental processor 223, voice synthesizer 225, speaker 226, audible alarm 227, and access authentication device 229.

As shown in FIGS. 6-8, door locks 277 are attached to office furniture component 270 and clasps 287 are positioned on each door 276. Door locks 277 and clasps 287 are positioned relative to each other so that clasp 287 is disposed between locking pin 285 and anchor 286 of door lock 277 when door 276 is in a closed position. Thus, when door lock 277 is actuated by equipment processor 221, locking pin 285 slides through clasp 287 and anchor 286, retaining door 276 in the closed position. Additionally, door sensor actuator 279 is positioned on each door 276 so that in the closed position actuator 276 is adjacent to door sensor 278, which is mounted on a member of office furniture component 270.

Referring now to drawers 280, each drawer has a drawer sensor actuator 284 mounted on a member of drawer 280 and positioned so that when the drawer is in a closed position, actuator 284 is adjacent to drawer sensor 282. Drawer sensor 282 is mounted on a member of office furniture component 270 adjacent to each drawer 280.

Referring now to FIG. 8, drawer locks 281 are shown in rear drawer cavity 283 which is located behind drawers 280. Each drawer 280 includes a clasp 287 mounted on a rear member of the drawer. Drawer locks 281 are located on rear drawer cavity 283 so that clasp 287 is disposed between locking pin 285 and anchor 286 when drawer 280 is in a closed position. Thus, when drawer lock 281 is actuated, locking pin 285 extends through clasp 287 and anchor 286, preventing drawer 280 from being opened.

Exemplary drawer locks 281 and door locks 277 are Model No. SCL-24 solenoid cabinet locks manufactured by Securitron Magnalocks, Corp. of Sparks, Nev. Alternatively, door locks 277 and drawer locks 281 may be magnetic field locks (not shown) having a magnetic field generator portion attached to one of office furniture component 270 and door 276 or drawer 280, as well as a metallic bar portion attached to one of office furniture component 270 and door 276 or drawer 280. An exemplary magnetic field lock is Model No. MCL-24 magnetic cabinet lock manufactured by Securitron Magnalocks, Corp.

Located on an outside surface of office furniture component 270, such as a front edge of work surface 271, as shown in FIG. 7, are LED indicators 233 and 234 and access input device 230. Access input device 230 is connected to access authentication device 229.

System 210 may advantageously include battery backup 232 that powers certain elements of system 210 in the event a power failure causes power supply 231 to lose power.

Office furniture component 270 may include opening 272 through work surface 271 as shown in FIG. 6 and paper shredder unit 273, shown in FIG. 7, which is mounted to office furniture component 270 and aligned with opening 272. Office furniture component 270 advantageously includes a cabinet or other space under paper shredder 273 for placing a wastebasket to catch the shredded remains of paper inserted through opening 272 and into shredder unit 273. Paper shredder 273 may be included in office furniture component 270 with or without the other elements and aspects of system 210.

Figure 9:
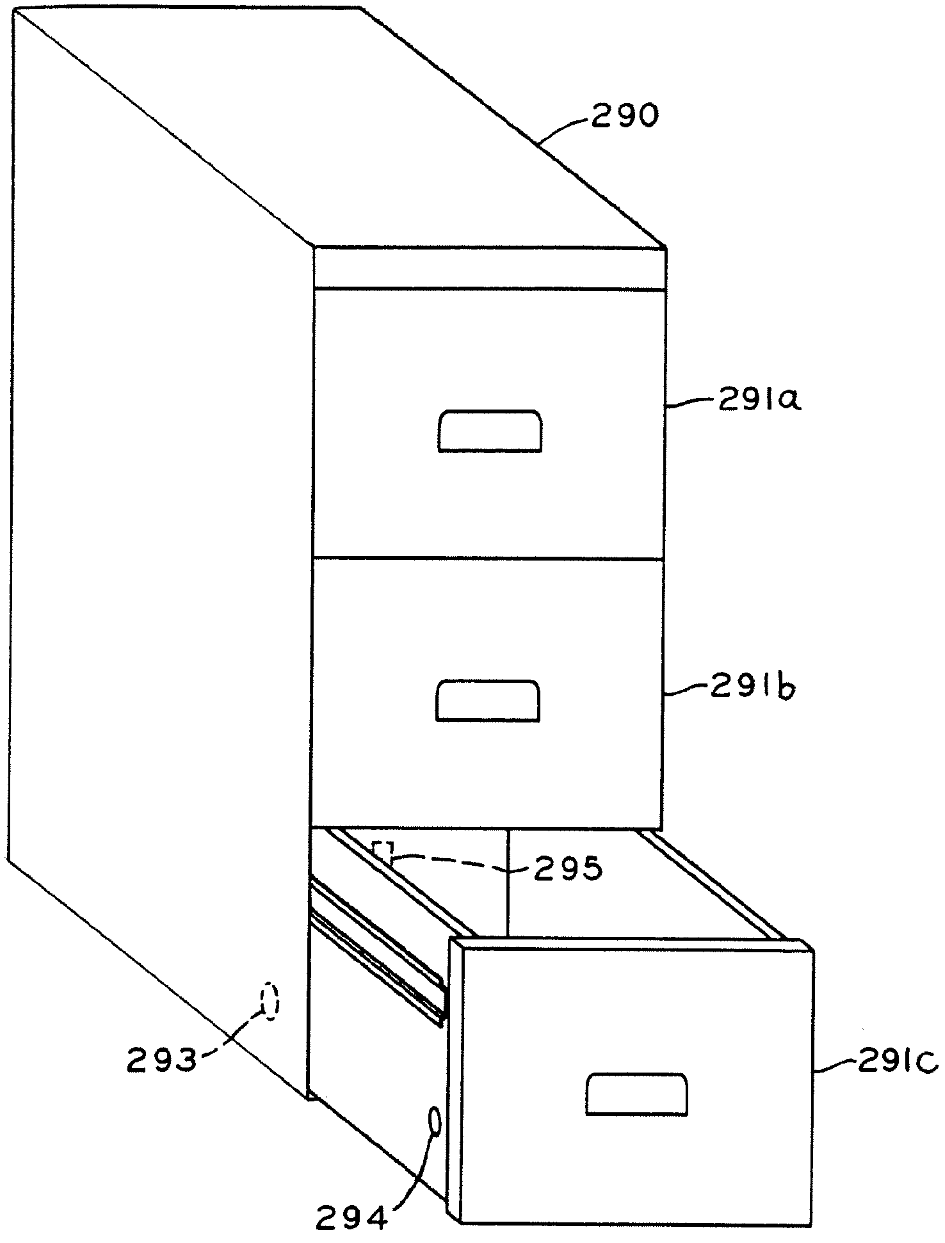
FIG. 9 is a perspective view of a file cabinet portion of a workspace security system in accordance with the present invention.

System 210 may also include additional office furniture components, such as file cabinet 290, shown in FIG. 9, for example. File cabinet 290 may be a freestanding system 210 or part of an integrated system such as system 310 or 410. File cabinet 290 includes drawer position sensors 293 located adjacent to each file drawer 291. Drawer sensor actuators 294 are positioned on a member of each drawer 291 and are adjacent to drawer position sensors 293 when the drawer is in a closed position. Drawer locks 295 are positioned on a member of file cabinet 290 adjacent to each file drawer 291, and lock clasp 296 positioned on a member of each drawer 291 so that drawer locks 295 will engage lock clasp 296 when the drawer is closed and lock 295 is actuated. To enhance safety, operating processor 220 may allow only one drawer 291 to be opened at a time by selectively actuating drawer locks 295 on the remaining drawers 291*a* and 291*b* after one drawer sensor 293 indicates a first drawer 291*c* has been opened, thus eliminating the need to use a mechanical interlocking drawer safety slide with file cabinet 290 or other stacked filing furniture components. The exemplary locks and sensors for file cabinet 290 are the same as for furniture component 270 of FIG. 6 described above.

An exemplary scenario utilizing system 210 shown in FIGS. 6-8 and 10 is as follows. As an individual enters an office work area containing office furniture component 270, door sensor 214 or motion sensor 237 signals equipment processor 221 of the access event. Via processor interconnection 267, environmental processor 223 turns on lights 217 located in the work area and adjusts HVAC control 215 to a pre-selected comfortable office temperature. LED indicator 234 located on work surface 271 blinks red to indicate that office furniture component 270 is locked and secure. Each movable access component includes lock 277 or 281 and position sensor 278 or 282. Solenoid-actuated locks 277 or 281 as shown in FIG. 7 have a movable locking pin 285 that engages a lock clasp 287 on door 276 and lock anchor 286. Thus, for each accessible component of office furniture component 270, lock clasp 287 is held by locking pin 285 and lock anchor 286 so that cabinet door 276 or drawer 280 cannot be opened.

To access cabinet doors 276 and drawers 280, the individual activates access input device 230. For example, a key fob (not shown) containing an encrypted access code is presented by the individual to access input device 230. Access authentication device 229 will read the code from the key fob and will signal equipment processor 221. If access is granted by the system 210, red LED indicator 234 will be turned off and green LED indicator 233 will be turned on, audible access notification may be delivered through alarm 227 or speaker 226, and door locks 277 and drawer locks 281 will be disengaged so that cabinet doors 276 and drawers 280 may be opened. Processing of whether access should be granted can occur at any one of access authentication device 229 or processor 220, 240 or 250. Detection of an individual entering the work area can also cause the system 210 to process an alarm notification event if proper access authentication does not occur within a set span of time or number of attempts.

When the individual attempts to secure office furniture component 270 by again presenting a key fob to access input device 230, equipment processor 221 will verify that all cabinet doors 276 and drawers 280 are closed. Cabinet doors 276 include a sensor actuator 279 that activates door sensor 278 when the door is closed. Drawers 280 include a sensor actuator 284 that activates drawer sensors 282 when the drawers 280 are in closed position. If the attempt to secure office furniture component 270 is made when a door 276 or drawer 280 is open, audible alarm 227 or speaker 226 will notify the individual of the unsecure component.

If all movable access components are properly closed, system 210 will secure office furniture component 270 by actuating door locks 277 and drawer locks 281. After a predetermined delay such as to allow the individual to exit the office, lights 217 and HVAC 215 will be turned off or set to an energy-saving state by the environmental processor 223. Also after a preset time delay, further activation of door sensor 214 or motion detector 237, that is not followed by an authorized activation of access input device 230 within a given time, will result in system 210 entering an alarm event. System 210 sounds audible alarm 227 and is remotely or locally monitored by supervisory processor 240 or interconnected with an existing security monitoring system so that notification of alarm events can be indicated to appropriate personnel.

Access authentication device 229 and access input device 230 may advantageously authenticate proximity-based devices such as radio frequency identification cards (not shown), for example. Thus, when an individual possessing an authorized proximity-based device approaches office furniture component 270, operating processor 220 will grant access to doors 276 and drawers 280 and execute any other predetermined monitoring, control, or automation events. As the individual leaves the immediate area of office furniture component 270, operating processor 220 automatically locks down doors 276 and drawers 280. If any doors 276 or drawers 280 are left open, audible alarm 227 or speaker 226 warns the individual of the unsecure condition.

Another exemplary scenario illustrating embodiments of the present invention such as systems 310 and 410 shown in FIGS. 11 and 12 is as follows. A geographically distributed system 410 includes work areas each having a system 310 similar to that depicted in FIG. 11. Each work area or work site advantageously includes operating processor 220 interfaced with various devices and subsystems located at that work area. However, interconnection of system 410 via network 261 and Internet 263 allows monitoring and control of individual operating processors 220*a*-220*e* by supervisory processor 240 or management processor 250, even though each processor 220, 240 and 250 may be located at a different facility, city, state, or hemisphere. Geographic location of the various processors 220, 240 and 250 is unimportant because of the interconnections provided by network 261 and Internet 263. Security of the interconnections includes Webserver 264.

Referring to FIG. 12, operating processor 220*a* and 220*b* could be located in two different work areas of a single facility located in City A. Supervisory processor 240*a* monitors and controls aspects of system 410 that are connected to operating processors 220*a* and 220*b*. Thus, an operator located at supervisory processor 240*a*, which may be a computer having a display screen and keyboard (not shown), may monitor the work areas in which processors 220*a* and 220*b* are located. When an individual enters a work area monitored by operating processor 220*a*, proximity or other sensing activates imaging subsystem 235 to provide a real-time image feed on the supervisory processor 240*a* display screen. Additionally, with proper authorization codes, control and automation settings of operating processor 220*a* can be manually overridden or reset by the operator of supervisory processor 240*a* via a keyboard or other input device.

As a further example of a workspace system 410 as shown in FIG. 12, supervisory processor 240*c* located in City C can be configured to perform the same or different functions as supervisory processor 240*a* located in City A. Thus, when the operator of supervisory processor 240*a* is unavailable, an operator of supervisory processor 240*c* can monitor and control the aspects of system 410 associated with operating processors 220*a* and 220*b*. Management processor 250*a*, which may be directly interfaced to supervisory processor 240*a* or remotely interfaced via Internet 263, is also capable of functions similar to supervisory processor 240*a* or 240*c*. Thus, the operator of management processor 250*a*, whether located at the same work site as supervisory processor 240*a* or located at a remote work site, can monitor or reprogram the monitoring, control, and automation functions of not only supervisory processor 240*a* and operating processors 220*a* and 220*b*, but any processors in system 410 for which management processor 250*a* is given access.

For example, an individual operates management processor 250*a* and enters an authorization code through an associated keyboard or other device giving that operator authority to only monitor other processors in system 410. A different operator using management processor 250*a* enters an authorization code through the associated keyboard or other device which grants that different operator authority to monitor or change the control and automation programming or settings of processor 220 or 240 of system 410. Thus, for example, an operator at supervisory processor 240 or management processor 250 with proper access authority can instruct operating processor 220*a* to lock down all office furniture components 270 located in that work area even though access authentication subprocessor 229 associated with operating processor 220*a* had previously received proper access authority to unlock office furniture components 270.

The inventive security systems 20, 210, 310 and 410 may be used in a variety of settings for a variety of applications. For example, functions of systems 20, 210, 310 and 410, such as the automatic lockdown feature will advantageously enhance security and safety of mobile utility carts and other equipment used in hospitals and other work sites. Offices, banks, laboratories, warehouses, manufacturing facilities and other work sites may be monitored, controlled and automated by systems 20, 210, 310 and 410.

For example, a scenario in which system 210 is applied to mobile equipment is as follows. A hospital or medical clinic typically utilizes a number of mobile utility carts each likely having expensive and potentially dangerous pharmaceuticals and medical instruments contained within cart drawers and cabinets. Each cart (not shown) includes operating processor 220, proximity based access input device 230, cabinet door and drawer locks 277 and 281, cabinet door and drawer sensors 278 and 282, audible alarm 227, and battery backup 232. A technician utilizing the cart possesses a proximity-based access card. Thus, when the technician is within a predetermined proximity of the cart, proximity based access input device 230 receives an authenticating signal from the technician's access card and door and drawer locks 277 and 281 will be disengaged by operating processor 220, providing access to the cart drawers and cabinets. When the technician moves outside of the predetermined proximity of the cart, operating processor 220 will secure the drawers and cabinets by actuating cabinet door and drawer locks 277 and 281. If cabinet door and drawer sensors 278 and 282 indicate that a drawer or door is open and cannot be secured, then operating processor 220 sounds audible alarm 227 to warn the technician of the unsecure condition.

The above exemplary scenarios are illustrative only, and are not intended to limit the scope of workspace system 20, 210, 310 and 410. Processors 22, 26, 82, 220, 240 and 250 can be programmed to monitor, control and automate the various devices associated with the system in any desired manner known in the art or within the scope of the present invention.

Although the above security systems 20, 210, 310 and 410 have been described primarily in the exemplary environment of a workspace or office work area, the present security systems may also be used in a wide variety of other applications. For example, the present security systems may be used in a retail environment, such as for monitoring and/or controlling access to retail infrastructure components such as the exemplary jewelry display cases which are described below. Additionally, the present security systems may be used in a restaurant environment for monitoring and/or controlling access to food and supplies storage areas, such as refrigeration units and wine cellars, as well as for monitoring and/or controlling access to restaurant offices, cash handling areas, and bars, for example. The present security systems may also be used in a home or recreational vehicle environment for monitoring and/or controlling access to entertainment systems storage, valuables storage, and liquor storage areas, for example. In the hotel and accommodation industry, the present security systems may be used to control access to guest room cabinets, exercise and spa areas and storage cabinets, management facilities and offices, and other localized areas within a hotel or resort.

Many other applications for the present security systems will be apparent to one of ordinary skill in the art based upon the teachings herein. The foregoing examples illustrate the broad applicability of the present security systems to monitor and/or control access to utility components, such as those described herein and other similar utility components, as well as to the localized areas associated with one or more utility components.

Figure 13:
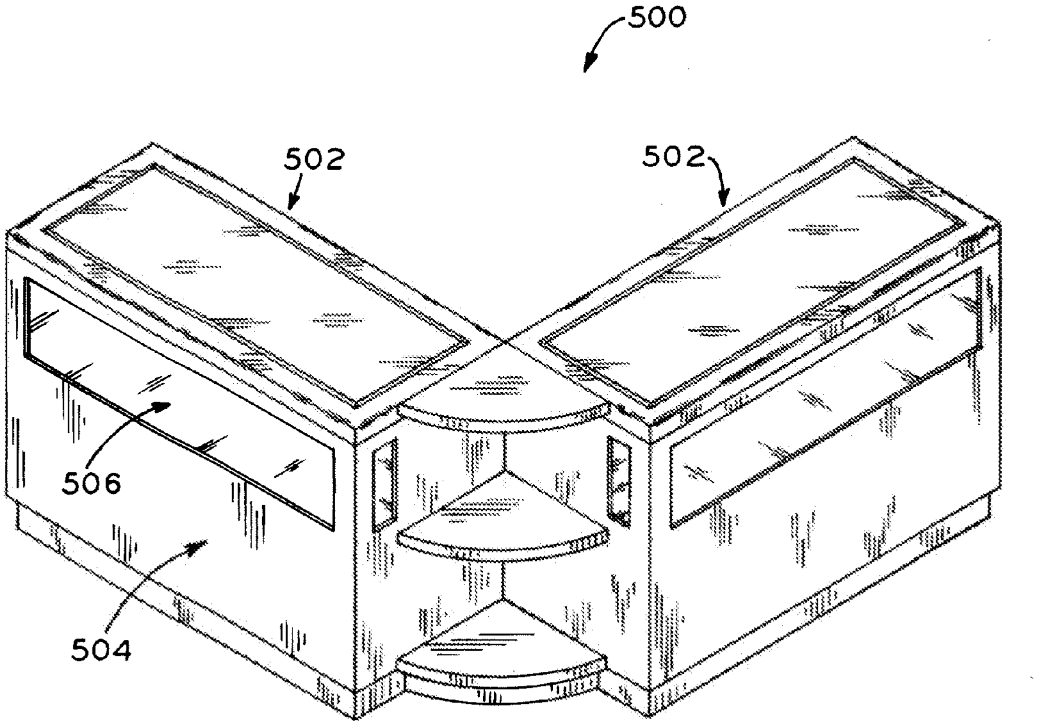
FIG. 13 is a perspective view of a pair of jewelry display cases, exemplifying the application of the present security system in a retail environment.
Figure 14:
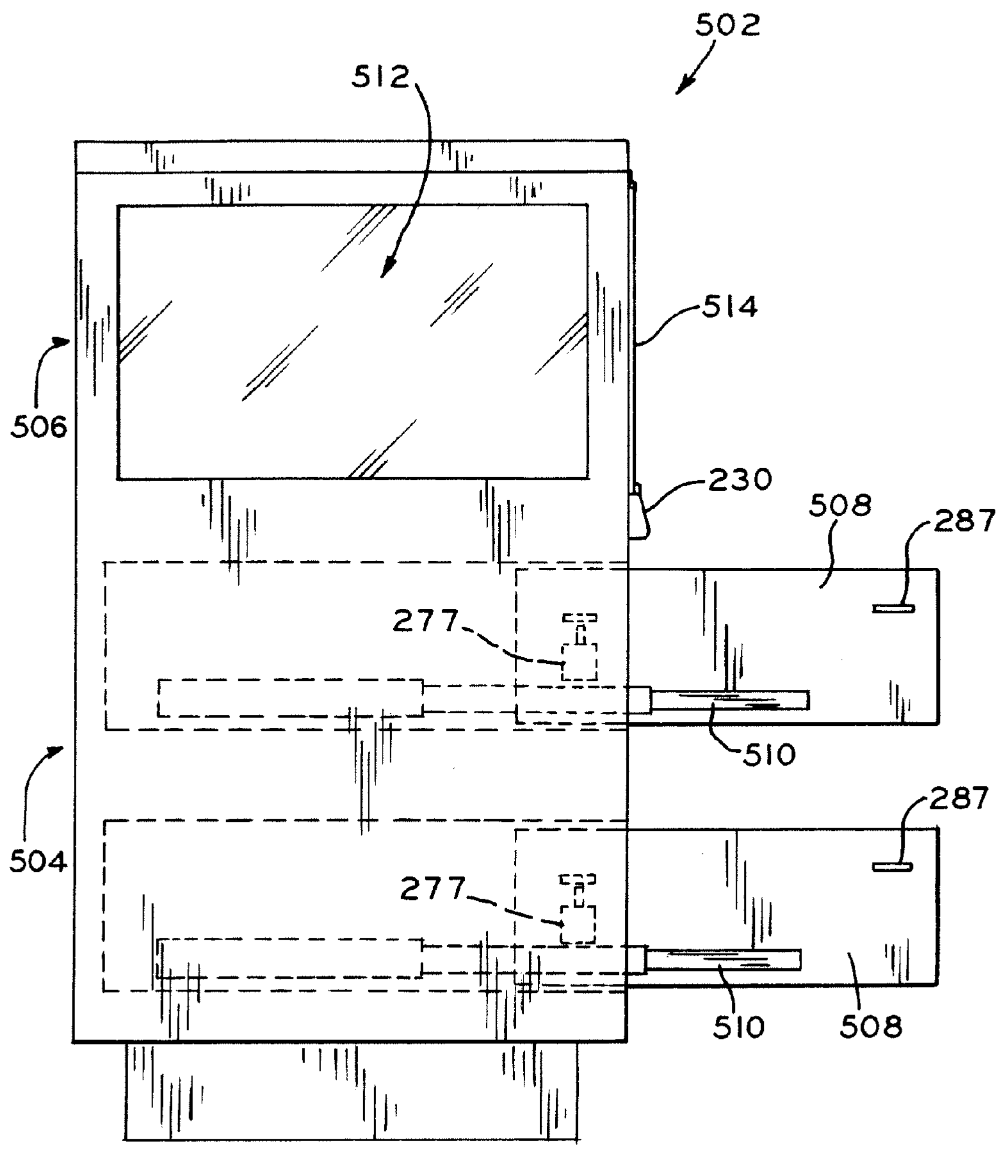
FIG. 14 is a side view of one of the jewelry display cases of FIG. 13.

For example, referring to FIGS. 13 and 14, a further exemplary application of the present security system in a retail environment is shown, including a localized area 500 which includes a utility component illustrated in the form of a pair of jewelry display cases 502. Localized area 500 may be a small retail space, such as a small jewelry store, or may be a designated department within a larger retail space, such as the jewelry department of a large retail store. Jewelry display cases 502 each generally include a lower cabinet portion 504 and an upper display portion 506. Referring to FIG. 14, lower cabinet portion 504 includes one or more movable access elements, shown herein as drawers 508 slidably mounted within lower cabinet portion 504 via drawer slides 510. Lower cabinet portion 504 also includes locking devices associated with drawers 508 which are similar to those described above, including door locks 277 mounted within lower cabinet portion 504, which are engageable with clasps 287 mounted to drawers 508. Lower cabinet portion 504 may also include an access authentication input device 230 similar to those described above, which may be a biometric sensor such as a fingerprint reader, for example.

Upper cabinet portion 506 is shown as a glass case including an interior display area 512 and one or more movable access elements, shown as one or more access doors 514 hingedly mounted to upper cabinet portion 508 and accessible by an employee from the rear of jewelry display case 502. Access doors 514 may also include suitable door locks such as those described above.

In operation, one or more employees of the retail facility, who are authorized to work within the localized area 500 around jewelry display cases 502 and/or access the interior of jewelry display cases 502, have mobile credential devices such as those described above, and the security system associated with jewelry display case 502 operates substantially identically to systems 20, 210, 310, and 410 described above, using the same or substantially similar operating sequences or subroutines. Further, the system associated with jewelry display cases 502 may also include an imaging apparatus as described above. In this manner, the security system may control and/or monitor access of employees to the localized area 500 surrounding jewelry display cases 502, as well as to control and/or monitor access of employees the interior of the jewelry display cases 502 themselves.

Additionally, the controllers and processors of the security systems described herein may also be programmed with instructions for recording time and attendance data associated with users or employees. For example, with respect to the embodiment described above, the security system may automatically detect and record times corresponding to the presence of an employee within localized area 500 via the employee's mobile credential for the purpose of determining working hours, similar to a conventional punch card-type time clock.

While this invention has been described as having exemplary embodiments and scenarios, the present invention can be further modified within the spirit and scope of this disclosure. This application is therefore intended to cover any variations, uses, or adaptations or the invention using its general principles. Further, this application is intended to cover such departures from the present disclosure as come within known or customary practice in the art to which this invention pertains and which fall within the limits of the appended claims.

What is claimed is:

1. A security system for use with a localized area, comprising:
- a utility component located within the localized area, said utility component having at least one movable access element;
- at least one processor including at least one stored access code and instructions for comparing said stored access code to access codes associated with a user that are input into said processor;
- a first access authentication device associated with the localized area and interfaced with said at least one processor;
- a second access authentication device associated with said utility component and interfaced with said at least one processor, said second access authentication device operable to generate an access code associated with the user;
- a locking element associated with said at least one access element, said locking element interfaced with said at least one processor; and
- at least one mobile credential device detectable by said first access authentication device, each said mobile credential device including at least one access code associated with a user.

2. The security system of claim 1, wherein said utility component is a storage component, and said at least one movable access element comprises at least one of a door and a drawer.

3. The security system of claim 1, wherein said first access authentication device includes an RF transmitter and receiver for polling and receiving said access code of said mobile credential device.

4. The security system of claim 3, wherein said first access authentication device further comprises at least one of:
- an antenna coupled to said RF transmitter and receiver and having a radiation pattern substantially enveloping an entryway to the localized area; and
- an antenna coupled to said RF transmitter and receiver and having a radiation pattern substantially around at least a portion of said utility component.

5. The security system of claim 1, wherein at least one said access code is associated with a biometric characteristic of a user.

6. The security system of claim 5, wherein said at least one access code is also stored within said processor, said at least one access code detectable by said first access authentication device and verifiable upon presentation by the user of the biometric characteristic to said second access authentication device.

7. The security system of claim 6, wherein said biometric characteristic is a fingerprint of a user and said second access authentication device is a fingerprint reading device.

8. The security system of claim 1, wherein said processor includes a memory with instructions for recording time and attendance data associated with a user of said mobile credential device.

9. The security system of claim 1, wherein said processor is interfaced with at least one of a controller and a monitor via at least one connection selected from the group consisting of an Internet, RF, and telephone connection.

10. A security system, comprising:

a utility component having at least one movable access element;

a processor associated with said utility component;

a locking element associated with said at least one movable access element and interfaced with said processor, said locking element having a first state in which said at least one movable access element is movable between an open and a closed position and a second state in which said at least one movable access element is locked in said closed position;

a proximity based access authentication device interfaced with said processor;

a non-proximity based authentication device interfaced with said processor;

at least one mobile credential device, each said mobile credential device including at least one access code associated with a user; and said processor comprising:

operating instructions for switching said locking element between said first state and said second state based upon access data received from said proximity based authentication device and said non-proximity based authentication device;

at least one stored access code; and evaluation instructions for evaluating access codes received from said proximity based and said non-proximity based access authentication devices.

11. The security system of claim 10, wherein said proximity based access authentication device includes an RF transmitter and receiver for polling and receiving an access code of said mobile credential device, and said proximity based access authentication device further comprises at least one of:

an antenna coupled to said RF transmitter and receiver and having a radiation pattern substantially enveloping a localized area around said utility component; and an antenna coupled to said RF transmitter and receiver and having a radiation pattern substantially around at least a portion of said utility component.

12. The security system of claim 10, wherein said processor includes a memory with instructions for recording time and attendance data associated with a user of said mobile credential device.

13. The security system of claim 10, wherein said processor is interfaced with at least one of a controller and a monitor via at least one connection selected from the group consisting of an Internet, RF, and a telephone connection.

14. The security system of claim 10, wherein at least one said access code is associated with a biometric characteristic of a user.

15. The security system of claim 14, wherein said at least one access code is detectable by said proximity based access authentication device and is verifiable upon presentation by the user of the biometric characteristic to said non-proximity based access authentication device.

16. The security system of claim 15, wherein said biometric characteristic is a fingerprint of a user and said non-proximity based access authentication device is a fingerprint reading device.

17. A method of operating a security system associated with a utility component, comprising the steps of:

detecting the presence of a mobile credential device within a localized area surrounding the utility component;

obtaining first data corresponding to a biometric characteristic of a user from the mobile credential device;

obtaining second data corresponding to the biometric characteristic of the user from the user;

comparing the first data with the second data; and granting access to the utility component if the first data matches the second data.

18. The method of claim 17, wherein said detecting step comprises polling with an RF transmitter and receiver to detect the presence of the mobile credential device.

19. The method of claim 18, wherein said first obtaining step comprises receipt of the first data in the form of a first access code from the mobile credential device.

20. The method of claim 19, wherein said second obtaining step comprises receipt of the second data in the form of a fingerprint of a user via a fingerprint reading device and converting the second data into a second access code.

21. The method of claim 20, wherein said comparing step comprises comparing the first and second access codes.

* * * * *